United States Patent
Dunn et al.

(10) Patent No.: US 9,732,883 B2
(45) Date of Patent: Aug. 15, 2017

(54) PASSIVE ALARM TO PREVENT BURIED INFRASTRUCTURE DAMAGE

(71) Applicant: ElectraWatch, Inc., Charlottesville, VA (US)

(72) Inventors: Ryan C. Dunn, Charlottesville, VA (US); Donald A. Tubbs, Charlottesville, VA (US)

(73) Assignee: EAS IP, LLC, Charlottesvile, VA (US)

( * ) Notice: Subject to any disclaimer, the term of this patent is extended or adjusted under 35 U.S.C. 154(b) by 163 days.

(21) Appl. No.: 14/318,127

(22) Filed: Jun. 27, 2014

(65) Prior Publication Data

US 2015/0128846 A1    May 14, 2015

Related U.S. Application Data

(63) Continuation-in-part of application No. 14/367,888, filed as application No. PCT/US2012/071096 on Dec. 20, 2012, now Pat. No. 9,568,121.

(Continued)

(51) Int. Cl.
*F42B 12/48* (2006.01)
*F16L 1/11* (2006.01)
*F42B 23/00* (2006.01)

(52) U.S. Cl.
CPC ............... *F16L 1/11* (2013.01); *F42B 12/48* (2013.01); *F42B 23/00* (2013.01)

(58) Field of Classification Search
CPC .............. F16L 1/11; F42B 12/48; F42B 23/00

(Continued)

(56) References Cited

U.S. PATENT DOCUMENTS 3,115,861 A * 12/1963 Allen ........................ F16L 1/11
                                                                  116/211
3,612,857 A * 10/1971 Beatty ..................... F42B 12/40
                                                                  102/342

(Continued)

*Primary Examiner* — R. A. Smith
*Assistant Examiner* — Tania Courson
(74) *Attorney, Agent, or Firm* — Paul A. Bell

(57) ABSTRACT

A method and apparatus are disclosed for preventing excavation damage to buried infrastructure. A plurality of excavation-sensing modules is buried near the buried infrastructure. The modules protect buried infrastructure by emitting dense clouds of highly visible gas when the modules are activated by impact with excavation equipment. In most cases the visible gas will be brightly colored and it may also have a strong odor and may produce a loud sound when the module is activated. The dense clouds of highly visible gas, the optional odor and loud sound alert construction crews or other workers that their excavation is nearing a protected underground structure. Once installed, no maintenance or active monitoring is required. In a preferred embodiment of the excavation-sensing module, the dense cloud of highly visible gas is produced by ignition of a smoke grenade within the module. In the preferred embodiment, the smoke grenade is ignited by the interaction of the excavator striking and breaking the buried module. Also in the preferred embodiment, the excavator will normally pull the ignited smoke grenade out of the buried module and to the surface increasing the visibility of the gas. Also in the preferred embodiment, a more reliable design for ignition of the smoke grenade is disclosed.

12 Claims, 30 Drawing Sheets

Related U.S. Application Data

(60) Provisional application No. 61/578,698, filed on Dec. 21, 2011.

(58) Field of Classification Search
USPC ............. 116/67 R, 200, 201, 203, 209, 211, 116/DIG. 14, 206, 214
See application file for complete search history.

(56) References Cited

U.S. PATENT DOCUMENTS

| | | | | |
|---|---|---|---|---|
| 4,623,282 A | * | 11/1986 | Allen | F16L 1/11 |
| | | | | 116/DIG. 14 |
| 4,988,236 A | * | 1/1991 | Ramsey | F16L 1/11 |
| | | | | 116/209 |
| 7,150,116 B2 | * | 12/2006 | Barry | E02F 5/003 |
| | | | | 116/209 |
| 2008/0178790 A1 | * | 7/2008 | Hatfield | G08B 5/002 |
| | | | | 116/209 |

* cited by examiner

PASSIVE ALARM TO PREVENT BURIED INFRASTRUCTURE DAMAGE

CROSS-REFERENCE TO RELATED APPLICATIONS

This application is a Continuation-In-Part of U.S. Ser. No. 14/367,888 which was filed as PCT/US2012/071096 on Dec. 20, 2102 and the instant application further claims the benefit of 61/578,698 filed on Dec. 21, 2011. The instant application incorporates by reference the disclosures of PCT/US2012/071096 and 61/578,698.

BACKGROUND OF THE INVENTION

Much of the nation's infrastructure is buried, including underground storage tanks, pipelines, power cables, and communication lines. The locations of these are not usually marked on the surface and are subject to excavation damage if a construction crew is not aware of their exact locations or if an operator is careless. For example, an extensive network of critical pipeline infrastructure delivers gas and oil throughout the United States. Recent natural gas and petroleum industry incidents have drawn renewed attention to the topic of pipeline safety. While construction crews are required to call and verify locations of utility lines before commencing excavation, not all do. Although utility and pipeline markers as well as pipeline maps are available and in use, excavation damage to pipelines still occurs [Haurwitz, R. K. M, Nesmith, J., Abilene Blast Shows Deadly Holes In Call-First Excavation Law, The Statesman, 2001 Jul. 24.}. Given the high risks to people, property, and the environment, systems that can prevent excavation damage to pipelines are needed.

The federal Pipeline and Hazardous Materials Safety Administration (PHMSA) monitors damage from pipeline incidents, and coordinates communication about and response to pipeline incidents [Hall, S. PHMSA's Damage Prevention Assistance Program: Strengthening State Damage Prevention Programs, Ohio Gas Association]. The Pipeline Inspection, Protection, Enforcement and Safety Act of 2006 calls for the development of enhanced measures and technologies to increase safety in pipeline transportation [Global Legal Information Network] Pipeline Inspection, Protection, Enforcement, and Safety Act of 2006. Washington (DC): While laws mandating pipeline safety exist, the specific applications and safety requirements vary from state to state [see e.g., Alabama 811 (Alabama One Call). One Call Laws Summary/State One Call Laws and Provisions. Fultondale (AL): AOC]. For this reason, excavation damage prevention is implemented at the state and local level [Hall, S. PHMSA's Damage Prevention Assistance Program: Strengthening State Damage Prevention Programs. Ohio Gas Association. In: CGA Excavation Safety Conference presentations, 2009 Feb. 17; Orlando, Fla.].

Several types of systems already exist (discussed below in Prior Art) that are designed to alert the pipeline companies of potential excavation damage. However, by the time the pipe-line company is notified and personnel are dispatched to alert the construction crew, the damage has already occurred in most cases. Fewer systems exist for alerting the construction crew itself conducting the excavation. Furthermore, many of these systems are best suited for new construction and are not applicable for existing pipelines. Many also require high maintenance or operation costs. The present invention would warn construction crews that they are near a pipeline or any other buried infrastructure with the use of devices that contain environmentally safe, brightly colored odoriferous gas that when released will make a loud audible sound. If the excavation crew is not aware that it is near pipelines, these devices would alert them to their presence.

As of 2003, there are more than two million miles of natural gas and petroleum transmission and distribution pipelines in the U.S. [Pipeline and Hazardous Materials Safety Administration General Pipeline FAQs: How big is our pipeline infrastructure: how many miles of what kinds of pipelines are there in the United States? Washington (DC): PHMSA]. According to PHMSA, the annual cost of significant pipeline incidents between 1991 and 2010 ranged from tens of millions of dollars to greater than 1 billion dollars [Significant Pipeline Incidents. Washington (DC): PHMSA]. (Between 1997 and 2001, property damage from natural gas pipelines in the US ranged from at least $10M to $45M, and property damage from petroleum pipelines ranged from at least $30M to $190M [Pioli, C. A, DiPalma, F. T. Pipeline Integrity Management Enhanced Safety, in: National Safety Council conference presentations, 90th Annual Congress and Expo, 2002 Oct. 7; San Diego, Calif., p. 15]). Historically, of the damage to natural gas pipelines, approximately 35% is due to damage from excavation [C-Fer Technologies, Risk and Reliability Analysis for Pipelines, in: $CO_2$ Capture and Storage Workshop presentations, 2006 Jan. 27; Calgary, Alberta, p. 8].

Similar hazards and costs exist for buried power cables; electrocutions and explosions can occur if these cables are cut. Underground storage tanks (USTs) can contaminate ground water or release toxic chemicals into the atmosphere if breached during an excavation. Buried communication lines may be less hazardous, but costs of disruption of communication are significant and growing.

There are many potential applications for excavation detection system technology, from installation during new pipelines as well as retrofitting existing pipelines in High Consequence Areas (HCAs). HCAs are areas where a release of natural gas or petroleum would cause significant damage to people, property or the environment [National Pipeline Mapping System (Pipeline and Hazardous Materials Safety Administration) [Internet]. Data Dissemination. Washington (DC): NPMS (PHMSA)]. Many potential customers exist in the local, regional, national, and international pipeline companies that provide natural gas and petroleum transport in the United States New pipelines planned in the US range from small projects [Pipelines International: New Pipeline Projects to Bring Gas Down South in US. Houston (Tex.): Pipelines International, 2010 November 91 to larger projects involving hundreds to thousands of miles of new pipeline [Pipeline and Gas Journal ONEOK Partners to Build New Gulf Coast Natural Gas Liquids Pipeline. *Pipeline and Gas Journal.* 2001 May; 238(5).}.

PRIOR ART

The industry associated with pipeline marking, detection, and excavation sensing is a $930 million per year industry with pipeline companies spending 3% of revenues annually on protective systems and technologies. A number of these technologies are discussed by Chastain [Chastain, S. Pipeline Right of Way Encroachment: Exploring Emerging Technologies that Address the Problem. Gardena (Calif.): International Right of Way Association, 2009 May/June] and Fabiano [Fabiano, A. Pipeline Monitoring and Locating Technologies. NYSEARCH (Northeast Gas Organization) In: Damage Prevention Workshop, 2008 Oct. 23; Saratoga Springs, N.Y. p. 5].

Currently there are four classes of systems in use that attempt to address the problem of excavation damage to underground utilities. The first technology classification comprises of systems and products that require a proactive excavation crew. The 811 "call before you dig" number, pipeline maps, pipeline frequency detectors and portable ground penetrating radar devices fall into this category. The second class of products are best described as passive visual indicators and comprise products like posted signs and markers, buried marker tape and colored dirt. The third technology classification is best described as "active indicators" and comprises systems which provide a visible indicator when excavation is occurring in the immediate vicinity of an underground utility. The final technology classification consists of monitored video and sensor systems designed to detect excavation and/or the presence of excavation equipment. Video surveillance, aircraft/balloon/satellite monitoring, buried fiber optic, geophone, seismic, and acoustic sensor systems fall into this category. Each system classification suffers one or more fatal flaws that fail to prevent excavation damage. Products and systems in the first two technology classifications require a proactive excavation crew and do not provide an obvious warning signal. The monitoring and sensor based systems in the third classification, despite being costly and complex, only alert the owner/operator of the pipeline and do not have the ability to directly alert the excavation crew that is about to damage the pipeline, therefore failing to prevent excavation related accidents.

Systems & Products that Require a Proactive Excavation Crew

811, Dig Safe, Miss Utility, Etc.

While federal and state laws require that a "one call" service be contacted before digging, of the incidents in 2010 caused by excavation, 32% were caused by the excavation crews failing to call a "one call" hotline, and 25% of the incidents resulted from 811 being called but the locating service not adequately marking the buried utility.

Primary Problems:
 a proactive excavation crew is required, and
 marking and locating services are inadequate about 25% of the time.

Pipeline Maps

Pipeline maps are used by locating services in conjunction with ground penetrating radar and frequency transmitters and receivers to locate buried utilities. Maps are only good enough to locate the general area where the buried utilities are located and it is up to the experience of the locator to mark the exact location of the utilities.

Primary Problems:
 a proactive excavation crew is required,
 maps can out of date, and
 determination of the exact location of the buried utility is often difficult.

Portable Ground Penetrating Radar Devices & Pipeline Frequency Locator

In addition to the widely used Vivax and RadioDetection frequency pipeline locators, NYSEARCH, working with PipeHawk and Harris Technologies, developed a Ground Penetrating Radar (GPR) based pipeline locating system using a handheld pipeline locator developed by Pipehawk {Pipehawk [Internet]. Handheld/Portable Radar Device Alton, Hampshire (UK): PipeHawk [website accessed 2011 Jun. 4]. Available from: http://www.pipehawk.com/project-s.htm; D'Zurko, D. Handheld Pipe Locator. Parsippany (N.J.): NYSEARCH (Northeast Gas Organization) [Internet], 2008 May 29. Available from: http://www.nysearch.org/publications/2008/05-handheld-052908.pdf} and a portable pipeline locator developed by Harris Technologies. {D'Zurko, D., Davis, T. Harris Cast Iron Joint/PE Pipe Locator. Parsippany (N.J.): NYSEARCH (Northeast Gas Organization) [Internet], 2008 May 29. Available from: http://www. nysearch. org/publications/2008/06-harris-070208. pdf}. These devices are used in conjunction with pipeline maps by utility locators. The technology is reported to work well a majority of the time but the devices are prone to sensing false positives which can cause the pipeline locator to incorrectly mark the pipeline. For the technology to work with non-metallic pipelines, a frequency marker tape must be buried alongside the plastic pipe. Over time the frequency marker tape can corrode making locating the buried utility difficult if not impossible.

Primary Problems:
 a proactive excavation crew is required,
 can produce false positive indications, and
 buried marker tapes can corrode causing the devices to not work.

Passive Visual Indicators

Posted Signs and Markers

Currently regulations require that buried utilities be marked with signs and other markers. Even signs and markers in good condition do not provide an obvious signal to an excavation crew that is not specifically looking for them. As they age they can fade, get damaged by animals and vehicles, be obscured by vegetation, or vandalized.

Primary Problems:
 a proactive excavation crew is required,
 non-obvious signal, and
 sign and marker damage with ageing.

Colored Dirt

Identifill is a system consisting of colored soil or sand that is placed immediately around or adjacent to pipelines [Identifill [Internet]. LaVerkin (UT): Identifill [website accessed 2011 Jun. 4]. Available from: http://www.identifill.com/content/OPS_Presentation.ppt.]. The colored dirt will provide a passive signal to a watchful excavation crew that they are digging near a buried utility. The soil is available in different colors that correspond to different types of buried utilities. It has the advantage of alerting the excavation crew directly and being technologically simple. Drawbacks of this product are that the colored dirt is only identifiable when excavation equipment is very close to the pipeline itself and that different lighting conditions in the trench (e.g., bright sunlight and dark shadows) or inadequate color contrast between the Identifill and surrounding dirt reduce the effectiveness of the warning that the colored dirt provides. The Identifill colored dirt is also only appropriate for new open trench pipeline installations as it would be difficult if not impossible to use in trenchless auger boring installation of new pipelines. It would also be difficult and expensive to dig up and fill in colored soil to already existing buried pipelines.

Primary Problems:
 a proactive excavation crew is required who must be looking for colored soil,
 common lighting conditions may make the colored soil difficult to distinguish,
 cannot be installed in trenchless auger boring installation of new pipelines, and
 cannot be retrofitted to existing pipelines Allen, U.S. Pat. No. 3,115,861 issued on Dec. 31, 1963, discloses another example of a warning system using colored dirt. Allen describes a system for facilitating the location of a buried pipeline using layers of colored soil provided directly over the pipeline and at various depths between the pipeline and the soil surface. Although the system is described as facilitating the location of a buried pipeline, it clearly would work to alert an excavation crew.

Primary Problems:
 a proactive excavation crew is required who must be looking for colored soil,
 common lighting conditions may make the colored soil difficult to distinguish,
 cannot be installed in trenchless auger boring installation of new pipelines, and
 cannot be retrofitted to existing pipelines Buried Marker Tape Buried marker tape can be installed in new open trench pipeline installations as a passive signal to mark buried utilities. The marker tape will provide a passive signal to a watchful excavation crew that they are digging near a buried pipeline; the tape is available in different colors that correspond to different types of buried utilities. It has the advantage of alerting the excavation crew directly and being technologically simple. Drawbacks of this product include the non-obvious warning signal and the fact that it cannot be retrofitted to existing pipelines or installed in new trenchless auger boring pipeline installations.

Primary Problems:
 a proactive excavation crew is required who must be looking for buried marker tape,
 marginally obvious signal,
 cannot be installed in trenchless auger boring installations of new pipelines, and
 cannot be retrofitted to existing pipelines.

Active Visual Indicators

Schertler et al.

Schertler et al. [U.S. Pat. No. 3,718,113], issued Feb. 27, 1973, teaches the use of a buried visual warning device comprising an indefinitely long, flexible tube containing a multitude of visible gas sources that release visible gas when the tube is ruptured. In a preferred embodiment, Schertler et al. uses one such device on each side of a buried pipeline. A major drawback of this product is that you must essentially install three pipelines whenever you wish to have a single pipeline. The Schertler et al. system is obviously intended for new construction and would not be suitable as a retrofit for existing pipelines. In addition, it would seem to be impracticable to use the Schertler et al. system in new trenchless auger boring pipeline installations.

Primary Problems:
 cannot be installed in trenchless auger boring installations of new pipelines,
 intended for new construction, and
 not suitable as a retrofit for existing Pipelines. Hosack Hosack [U.S. Pat. No. 3,581,703], issued Jun. 1, 1971, teaches the use of a buried warning tape to signal the presence of an underground installation such as a pipeline. The warning tape includes capsules containing a smoke-releasing or otherwise attention compelling chemical substance which is released when the tape is ruptured by contact with excavation equipment. The warning tape is buried a few feet above the pipeline and runs continuously parallel to the buried pipeline. A major drawback of this product is that is appears to be suitable only for new trench-type construction.

Primary Problems:
 cannot be installed in trenchless auger boring installations of new pipelines,
 intended for new construction, and
 not suitable as a retrofit for existing pipelines Monitored Video and Sensor Systems Fiber Optic Sensor Systems The Gas Technology Institute has proposed a fiber optic cable installed above a pipeline. Light signals periodically sent through the fiber change when heavy construction equipment compresses the soil above the fiber, and the changes in reflected light are then analyzed to determine if the cause of the change in light signal is a potential problem. The concept has been shown to work, but currently lacks the sensitivity in the field to be useful, and requires a complex network of monitoring hardware be installed along the pipeline, making the system expensive and difficult to retrofit to existing buried pipelines. Fiber SenSys also offers a similar fiber optic system targeted more at pipeline security and preventing terrorist threats but mentions that the system could also be used to prevent accidental excavation damage. Both of these systems have high upfront, installation and reoccurring monitoring costs. Both lack immediate notification to the excavation crew.

Primary Problems:
 does not alert the excavation crew, and
 expensive.

Another example of a fiber optic warning system is shown by Eslambolchi et al. U.S. Pat. No. 5,991,013, issued Nov. 23, 1999. Eslambolchi discloses a system for protecting a buried fiber optic cable from excavation damage. Eslambolchi uses a sacrificial fiber optic cable buried a few feet above the main fiber optic cable. This sacrificial cable has a warning tape attached to one side thereof. The warning tape may carry indicia indicating the presence of the main fiber optic cable. The sacrificial cable carries an optic signal which is interrupted in the event of excavation damage. The optic signal from the sacrificial cable is processed in a central facility where the presence of and location of any excavation damage is determined. At that point, equipment at the central facility can sound an audible warning signal through remote speakers which may be emplaced along the path of the main cable, or a radio signal may be broadcast directly to the excavation crew.

Primary Problems:
 expensive,
 intended for new construction,
 cannot be installed in trenchless auger boring installations of new pipelines, and
 not suitable as a retrofit for existing pipelines Future Fibre Technologies (FFT) has developed another fiber optic sensor system called SecurePipe. Their fiber optic cable has three strands through which a continuous light signal is sent. If there is any change in sound, motion or vibration, a signal is sent through the third strand to software which determines the location of the event and determines if the event is significant or minor FFT states that the system can detect intrusions within 150 m of the pipeline, and that no equipment, power sources, or buildings need to be within 25 miles of the pipeline. This system is currently in use in parts of the US and Europe by natural gas and petroleum pipeline companies in monitoring transmission pipelines, as well as by US Border patrol, US Army and Navy, DHS, and defense organizations in other countries. Though effective, this technology remains expensive to install and monitor and is difficult and very expensive to retrofit to existing buried pipelines. Because of the sensitivity of the system, the system also generates many false positive excavation damage warnings that are expensive and cumbersome to investigate. This complex system also only alerts the owner of the pipeline that the potential for pipeline damage exists and does not alert the excavation crew in jeopardy of damaging the pipeline. The monitoring system costs $180,000 plus a cost of $63,000 per mile for cable and installation costs and reoccurring $5,000 monthly monitoring charges.

Primary Problems:
  does not alert the excavation crew,
  expensive, and
  numerous false positives.

Acoustic Sensor Systems

Acoustic sensor systems rely on detecting the sound of excavation equipment when it strikes pipelines. The Gas Technology Institute is studying a system using acoustic sensors, power supplies, and remote transmitting devices placed along the length of a pipeline. The sound detected is analyzed, and if determined by the alarm system to be significant, a radio alert is dispatched to pipeline monitoring personnel. Unfortunately, once the excavation equipment strikes a pipeline, damage may already be occurring. General Electric Oil and Gas developed a similar system called THREATSCAN. Their technology can be used on pipes located at the ground surface or at depth. The power supply is solar with a battery backup. Each sensor communicates with a satellite that sends data to a monitoring site for analysis. The site monitors data continuously every day, 24 hours a day. GE states that reports can be generated within 30 minutes of activity. This system allows development of monthly logs to develop knowledge of ongoing activity in the area. The THREATSCAN system is currently in use by pipeline companies in the US and Europe. The system has been evaluated by the PRCI and has been found to meet OS's stated notification time and event location capabilities but has high operating costs. Again, the delay between an event and notification to the excavation crew means that it is unlikely that this system would prevent a pipeline incident. The THREATSCAN system costs $20,440 per mile plus significant installation costs and a yearly monitoring charge of $6,000.

Primary Problems:
  does not alert the excavation crew, and
  expensive.

Geophone/Seismic Sensor Systems

Physical Sciences, Inc., has developed a system of infrasonic seismic sensors (PIGPEN) [D'Zurko, D., Frish, M. PIGPEN. Parsippany (N.J.): NYSEARCH (Northeast Gas Organization) [Internet], 2008 May 29. Available from:
  http://www.nysearch.org/publications/2008/02-PIGPEN-052908.pdf.] that can detect excavation intrusions based on the acoustic signature.

The sensors are placed at the ground surface above pipelines, and can detect activity at a distance exceeding 300 feet, and can locate the activity to within 30 feet. Testing showed these sensors to have a 86% probability of detecting a threat within a protected area and of that 91% of the time the system will correctly classify the threat, yielding a combined 78% overall system success rate. The system was designed to be relatively low cost with a per mile equipment cost of $10,100; however it is complex and requires significant full-time manpower to install and continuously operate. Other shortfalls of this system include the reliance on batteries that require periodic field replacement. Like the Future Fibre Technologies, the sensitivity of the system generates many false positive excavation damage warnings that are expensive and cumbersome to investigate. This system like the other in this category only sends an alarm to the owner/operator of the protection system and does not notify the excavation crew who is in danger of damaging the pipeline.

Primary Problems:
  does not alert the excavation crew,
  expensive, and
  numerous false positives.

Magal-Senstar offers a PIPEGUARD system of underground geophone sensors placed at depths of three feet and powered by a lithium battery [Fabiano, A., Welton, R. Third Party Damage Prevention/Detection Systems: Magal-Senstar Inc. Parsippany (N.J.): NYSEARCH (Northeast Gas Organization) [Internet], 2008 May 29. Available from: http://www.nysearch.org/publications/2008/04-Maga1052908.pdf.]. Each sensing unit communicates with its nearby sensors through a robust mesh network, either through fiber optic cables or wireless radio communication. All communications are eventually routed to a main control center to further manage threats detected by the system. Magel-Senstar claims an intrusion detection rate exceeding 98%; however, like both the Future Fiber Technologies system and the PIGPEN system, its sensitivity generates many false positive excavation damage warnings, which are expensive and cumbersome to investigate. At a cost of approximately $116,000 per mile for sensors and installation, $40,000 for the system, and an additional $5,000 per month for monitoring costs, the system is prohibitively expensive and still only sends an alarm to the owner/operator of the protection system. It does not notify the excavation crew who is in danger of damaging the pipeline.

Primary Problems:
  does not alert the excavation crew,
  expensive, and
  numerous false positives.

Fixed Mounted Video

Video imaging systems attempt to record pictures of the area around pipelines in order to detect any changes that have occurred. This kind of system relies on image processing software, which can make errors or miss changes. Additionally, this kind of system has a lag time between the excavation damage occurring and it actually being detected by the software. By the time the damage has been detected, it is too late to stop the excavation crew to prevent further damage. Finally, the cost of these systems is high due to the required high definition cameras, image processing software, data transmission, power requirements, and reoccurring monitoring charges. These systems can become obscured by vegetation or can be damaged by vandalism, animals or vehicles.

Primary Problems:
  does not alert the excavation crew,
  expensive, and
  numerous false positives.

Aircraft, Space Balloon, Satellite Monitoring

Intellitech Microsystems has developed a small aircraft or drone system to provide video monitoring of pipelines. In the event unauthorized excavation activity is detected, an image is sent to the aircraft operator for comparison with baseline images to determine if the activity is a potential threat. Drawbacks of this method include the low altitude (200 m) at which the aircraft operates, making it suitable for monitoring pipelines in unpopulated areas, but not for distribution pipelines in more populated areas. The method is also slow as it takes time for the operator to receive an image, compare it to baseline images, and then communicate with a construction crew at the pipeline site. Lastly, the method is very expensive requiring an aircraft, support systems, and personnel to operate and maintain the aircraft and to analyze the data. Primary Problems:
  does not alert the excavation crew,
  not suitable for pipelines in populated areas,
  slow, and
  expensive.

Space Data Corporation has proposed another method that uses a high-altitude (11-15 miles) balloon network to monitor a ground-based laser detection system. Each balloon transceiver unit has a 400-mile overlapping region that it monitors. Two lasers at a distance of 3-5 feet above the pipeline would detect excavation equipment in the laser's path, as well as the presence of natural gas. An event would generate an alarm and a signal would be sent to the balloon network for transmission to a monitoring site. High operating costs and lack of direct notification to the construction crew are again significant drawbacks as are varying weather and atmospheric conditions, e.g., clouds, haze, humidity, etc. Lastly, some pipeline companies employ aircraft monitoring services that commission planes to fly above pipeline systems to monitor potential threats. These services are extremely expensive and would have to be actively monitoring ongoing excavation to have any chance at stopping a potential threat.
Primary Problems:
  does not alert the excavation crew,
  slow,
  expensive,
  numerous false positives, and
  subject to weather interference.

Southwest Research Institute has developed the IACC (Impressed Alternating Cycle Current) method which detects changes in voltage between a pipeline and adjacent soil when excavation equipment is detected. This technique is not yet practicable due to low sensitivity [Burkhardt, G. Real-Time Monitoring of Pipelines for Third-Party Contact, Morgantown (WV): National Energy Technology Laboratory (Department of Energy) March 2006].
Primary Problems:
  not yet practicable.

The above analysis of competing technologies validates the magnitude of the third party excavation damage problem within the pipeline industry by highlighting the number of companies and organizations who have invested tens of millions of dollars developing systems to try and prevent third party pipeline damage. Unfortunately, these systems are for the most part ineffective or are targeted at alerting the owner/operator of the pipeline and not the excavation crew actually at risk of damaging the pipeline infrastructure. Even if the owner/operator is promptly notified, it is likely that the excavation crew will have damaged the pipeline before they can be notified.

SUMMARY OF THE INVENTION

As discussed above, there are currently three classes of systems in use to address the problem of excavation damage to underground utilities: systems and products that require a proactive excavation crew; passive visual indicators; and monitored video and sensor systems. A modification of the 2° d category, passive visual indicators is also known which utilizes an active visual signal. That is an active visual signal is produced by excavation equipment operating in the vicinity of the buried infrastructure. Some prior art systems in this intermediate category, such as Schertler et al. [U.S. Pat. No. 3,718,113] and Hosack [U.S. Pat. No. 3,581,703] provide a visible smoke signal at the site of the potentially damaging activity yet still require a continuous device being buried near the buried infrastructure. Any system which requires a continuous buried device is only practical for new construction. In contrast to these prior art systems, the current invention provides for multiple, discrete alert modules with each module being buried near the buried infrastructure. This avoids the necessity of a continuous device and makes it possible and convenient to protect existing buried infrastructure. In addition, the current invention may also easily be used with new construction.

In a preferred embodiment, the excavation detection system of this invention comprises multiple, discrete self-contained excavation-sensing modules which, when disturbed by excavation equipment, will emit one or more markers which can be detected by sight, sound and/or smell. An example of such a marker is an environmentally safe, brightly colored, odoriferous gas that when released will make a loud sound. It is clear, however, that the marker emitted by the excavation detection system of the current invention does not have to be detectible by all of these senses. For example, the marker may just be a visible gas. It could also be an invisible, odoriferous gas. Or it could be a gas which makes a loud sound when released by the module. The excavation-sensing modules will be triggered during excavation that could endanger the buried infrastructure. This passive system offers several advantages over other systems:

The system directly and immediately alerts the construction crew to the existence of the buried infrastructure at the site when excavating the soil above or near the infrastructure. If the construction crew does not expect the infrastructure at the site, the loud release of brightly colored odoriferous gas will alert them to stop excavation.
  The system is applicable to both new and existing buried infrastructure. Many technologies aimed at providing a last line of buried defense are required to be installed during new installation or require the entire infrastructure to be dug up.
  Construction crew members need no advanced knowledge to interpret the display of the brightly colored gas.
  No power systems are required to maintain the excavation modules.
  The system will be small enough that it can be added to existing buried infrastructure without major excavation. Installation options can include air lances, modified mine laying vehicles, or augers. They could be routinely installed along a buried infrastructure wherever future construction or excavation is possible or in advance of planned excavation near an unprotected buried infrastructure.

Potential applications include the entire range of buried or underground infrastructure that is subject to excavation of the surrounding soil, including underground storage tanks, gathering pipelines which gather petroleum or natural gas from the source, transmission pipelines which transport petroleum or natural gas from gathering lines to other suppliers, distribution pipelines which bring natural gas and petroleum directly to the customer, communication cables and conduits, buried power lines, sewer and water pipelines, steam conduits and the like.

It should be understood that wherever in this application the terms "colored gas" or "visible gas" are used they refer to a vapor that is readily visible via pigments, airborne particles, aerosols, inherent color or noticeable visible light scattering. It should furthermore be understood that in this application the terms "gas," "smoke," and "vapor" are used somewhat interchangeably. It should also be noted that terms "colored gas" or "visible gas" are also being used somewhat interchangeably.

DETAILED DESCRIPTION

Figure 1:
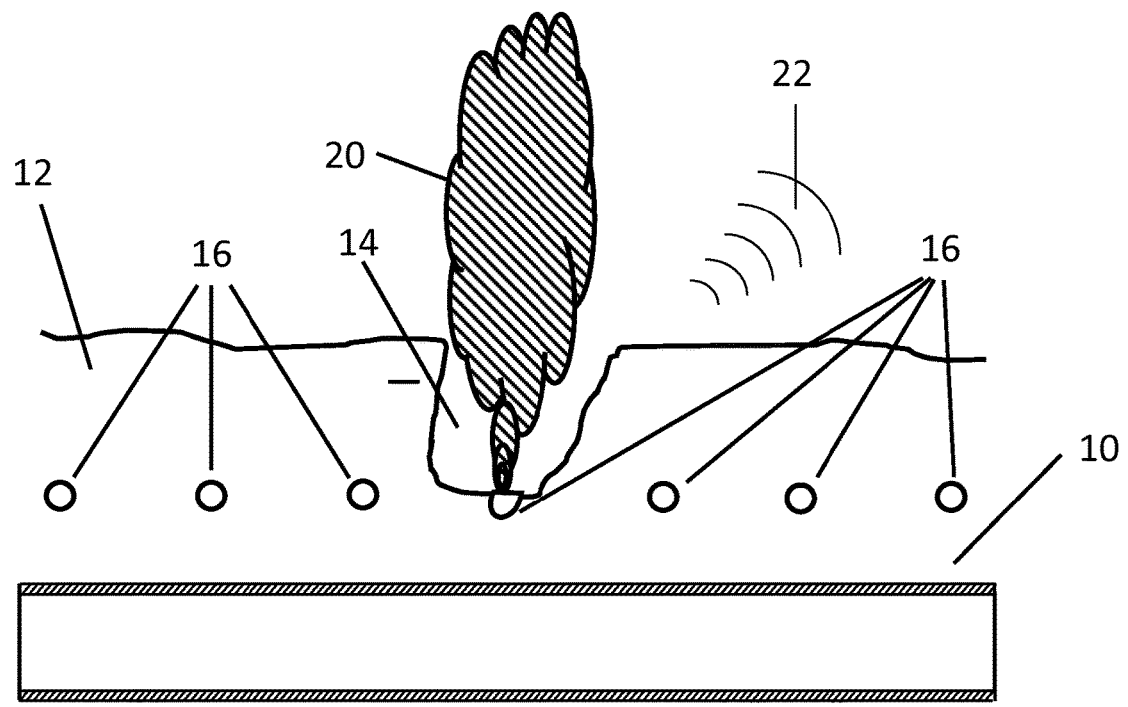
FIG. 1 shows a buried infrastructure with generally spherical buried infrastructure excavation-sensing modules in place.

FIG. 1 shows a cross-section of a buried infrastructure 10 [in this embodiment a pipe] buried in soil 12. Above the pipe 10, also buried in soil 12 are buried infrastructure excavation-sensing module units 16. A trench or hole 14 has been excavated in soil 12 and exposed one of the buried infrastructure excavation-sensing module units 16. The excavation-sensing module 16 thus exposed has been activated by the excavation and is emitting a cloud of colored, odorous gas 20 and a loud alarm sound 22. The cloud of colored, odorous gas 20 and the loud alarm sound 22 from buried infrastructure excavation-sensing module 16 have alerted the construction crew [not shown] to the presence of the buried pipe 10.

Figure 2:
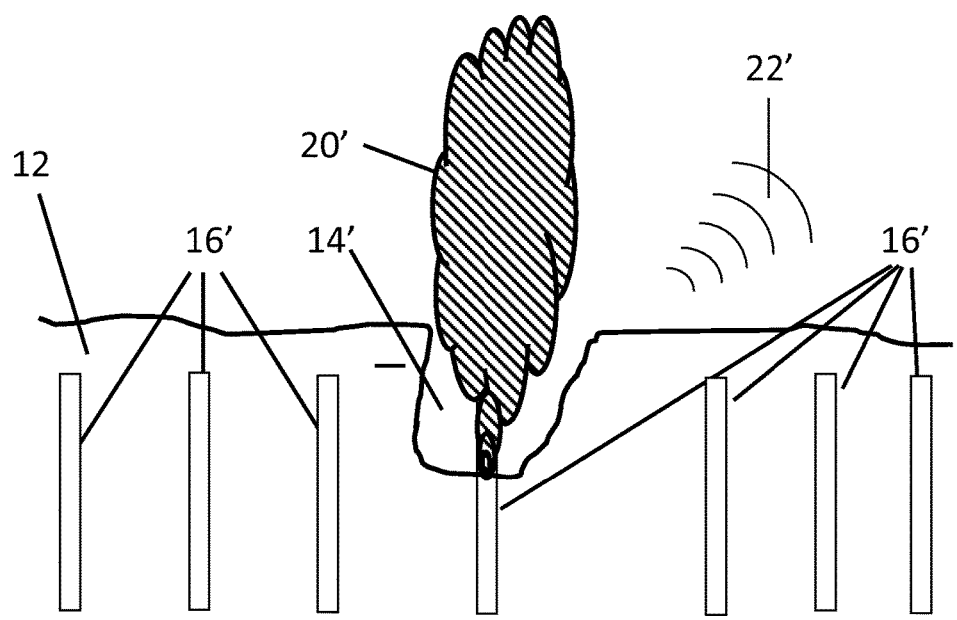
FIG. 2 shows a buried infrastructure with elongated buried infrastructure excavation-sensing modules in place.
Figure 2:
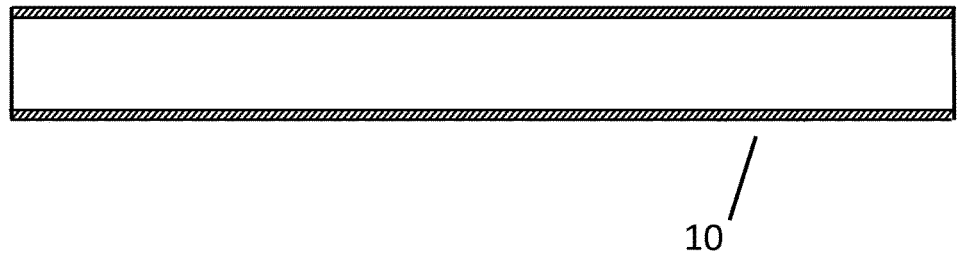

FIG. 2 shows a cross-section of a buried infrastructure 10 [in this embodiment a pipe] buried in soil 12. Above the pipe 10, also buried in soil 12 are buried infrastructure excavation-sensing modules 16'. These excavation-sensing modules are in the form of an elongated tube as described below and in FIGS. 7-11, 20 and 21. A trench or hole 14' has been excavated in soil 12 and the excavation equipment (not shown) has impacted one of the buried infrastructure excavation-sensing modules 16'. The excavation-sensing module 16' thus exposed has been activated by the excavation and is emitting a dense cloud of colored, odorous gas 20' and a loud alarm sound 22' The cloud of colored, odorous gas 20' and the loud alarm sound 22' have alerted the construction crew [not shown] of the presence of the buried pipe 10.

Figure 3:
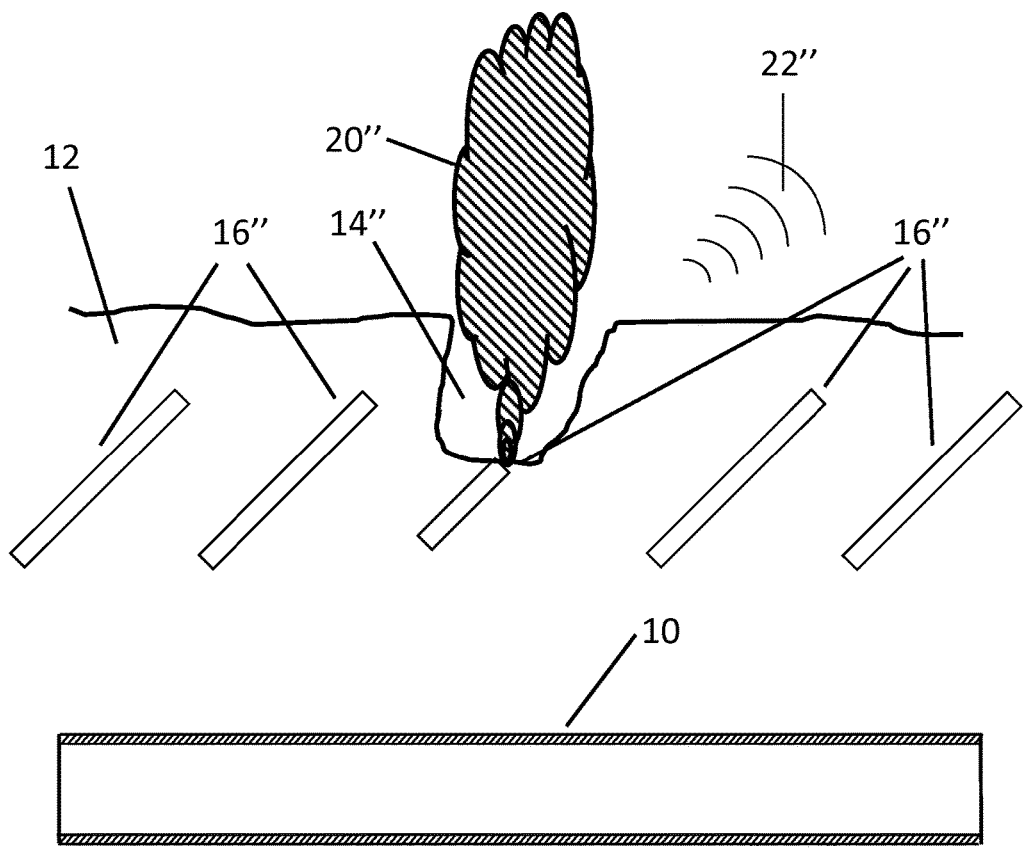
FIG. 3 shows a buried infrastructure with elongated buried infrastructure excavation-sensing modules emplaced at an angle to the vertical.

FIG. 3 shows a cross-section of a buried infrastructure 10 [in this embodiment a pipe] buried in soil 12. Above the pipe 10, also buried in soil 12 are buried infrastructure excavation-sensing modules 16". These excavation-sensing modules are in the form of an elongated tube as described below and in FIGS. 7-11, 20 and 21. The elongated excavation-sensing modules 16" are emplaced in soil 12 at an angle to the vertical. The reason for emplacement at angles other than vertical is to permit more effective protection of the buried infrastructure with fewer modules. In this figure, the angle is approximately 45 degrees to the vertical; however, it is to be understood that the modules could be emplaced at other angles, as desired. A trench or hole 14" has been excavated in soil 12 and impacted one of the buried infrastructure excavation-sensing modules 16". The excavation-sensing module 16" thus exposed has been activated by the excavation and is emitting a dense cloud of colored, odorous gas 20" and a loud alarm sound 22" The cloud of colored, odorous gas 20" and the loud alarm sound 22" have alerted the construction crew [not shown] of the presence of the buried pipe 10. The emplacement angles of modules 16 relative to the buried infrastructure, the spacing of the modules along the buried infrastructure, the placement and number of arrays of modules around the buried infrastructure as well as the length of the modules are all variables which will be determined for each particular protection scenario.

Figure 4:
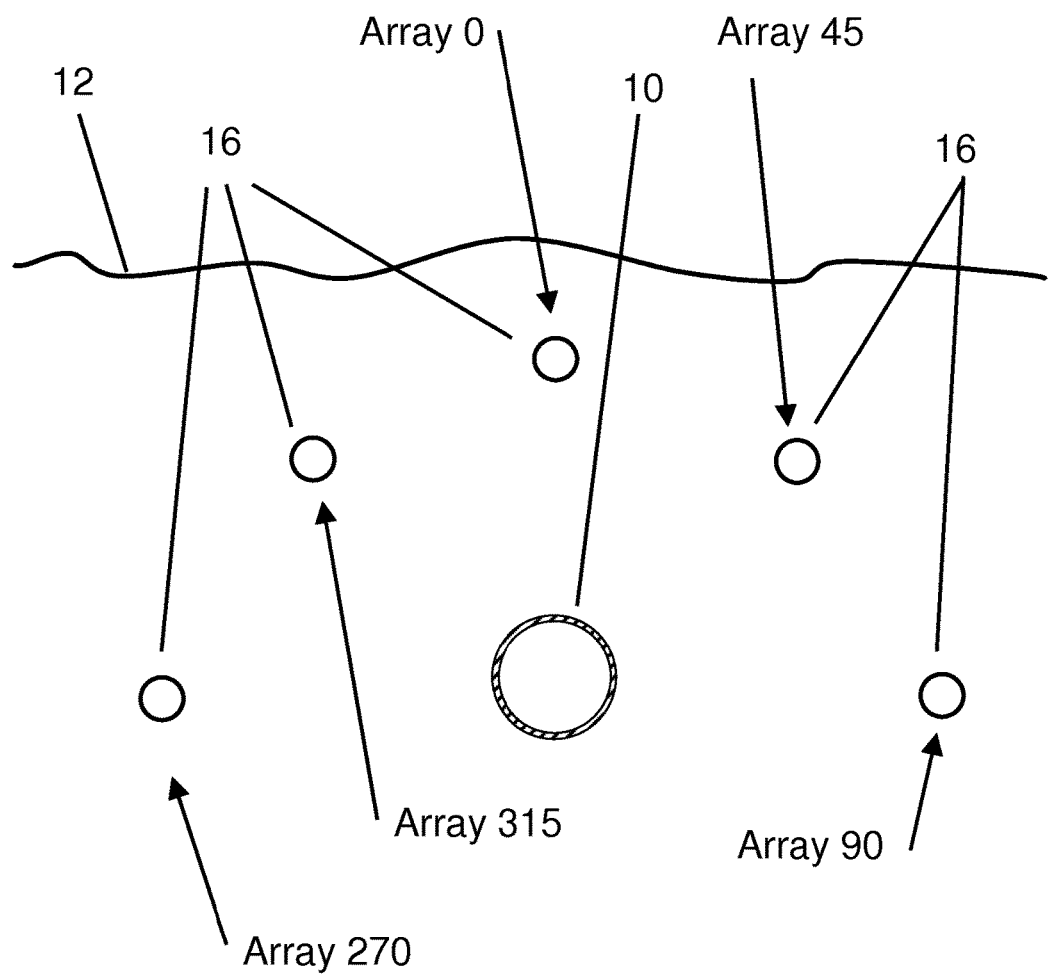
FIG. 4 shows a cross-sectional view along the axis of a buried infrastructure similar to that of FIG. 1 with generally spherical buried infrastructure excavation-sensing modules emplaced in linear arrays about the axis of the buried infrastructure.

FIG. 4 shows a view along the axis of a section of a buried infrastructure [a pipe 10] illustrating the emplacement of multiple arrays of generally spherical excavation-sensing modules 16. The excavation-sensing modules 16 are emplaced in multiple linear arrays at various radial positions about the longitudinal axis of pipe 10. The array of excavation-sensing modules labeled Array 0 is directly over pipe 10. The array labeled "Array 45" is emplaced at approximately 45 degrees clockwise from Array 0. In like manner the arrays labeled Array 90, Array 270 and Array 315 are emplaced clockwise from Array 0 at approximately 90 degrees, 270 degrees and 315 degrees respectively. The exact number of arrays and exact angular and/or vertical positioning of the arrays would be determined by local conditions for the protection scenario and perhaps even the perceived level of public danger involved with a potential breach of the buried infrastructure. For example, there well may be more arrays of excavation-sensing modules emplaced about petroleum pipelines or buried electric power lines than would be emplaced about a water or sewer main. It is envisaged that there normally would be no need to emplace excavation-sensing modules underneath and/or at depths below the depth of the pipe 10; however, this might be necessary if there was a tunneling hazard or due to other local conditions.

Figure 5:
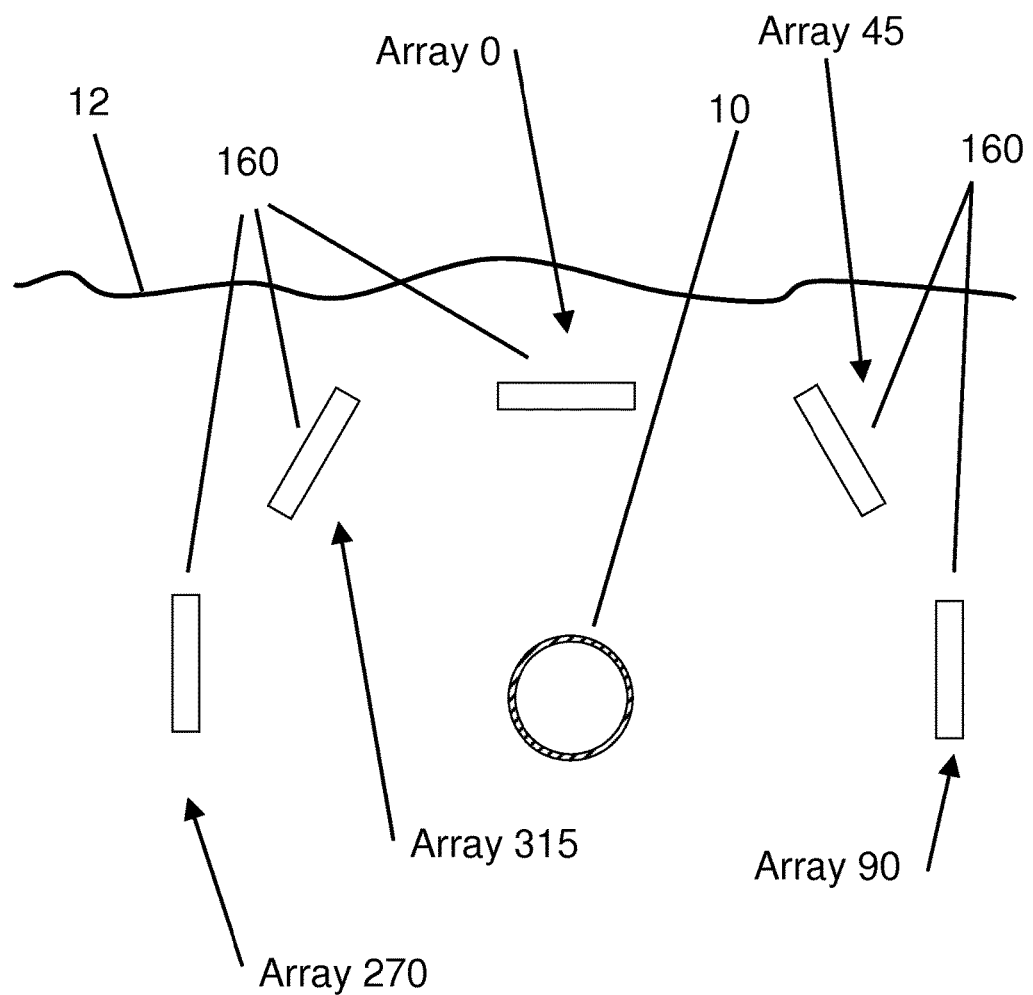
FIG. 5 shows a cross-sectional view along the axis of a buried infrastructure similar to that of FIG. 1 with elongated buried infrastructure excavation-sensing modules emplaced in linear arrays about the axis of the buried infrastructure. The arrays are emplaced at different angles to the vertical.

FIG. 5 shows a view along the axis of a section of buried infrastructure [a pipe 10] similar to that of FIG. 4. The excavation-sensing modules 160 are elongated and similar to those described below and in FIGS. 7-11, 20 and 21. They are emplaced in multiple linear arrays at various radial positions about the longitudinal axis of pipe 10. Modules 160 are emplaced at various angles to the vertical. The modules in Array 270 and Array 90 are emplaced in the vertical plane. The modules in Array 315 are emplaced at approximately 30 degrees to the vertical. The modules in Array 0 are emplaced at approximately 90 degrees to the vertical, while the modules in Array 45 are emplaced at approximately 30 degrees to the vertical but in mirror image to those in Array 315. It is to be understood that these angles are only representative of many different angular emplacements which could be used depending upon the exact circumstances of an individual buried infrastructure protection scenario.

Figure 6:
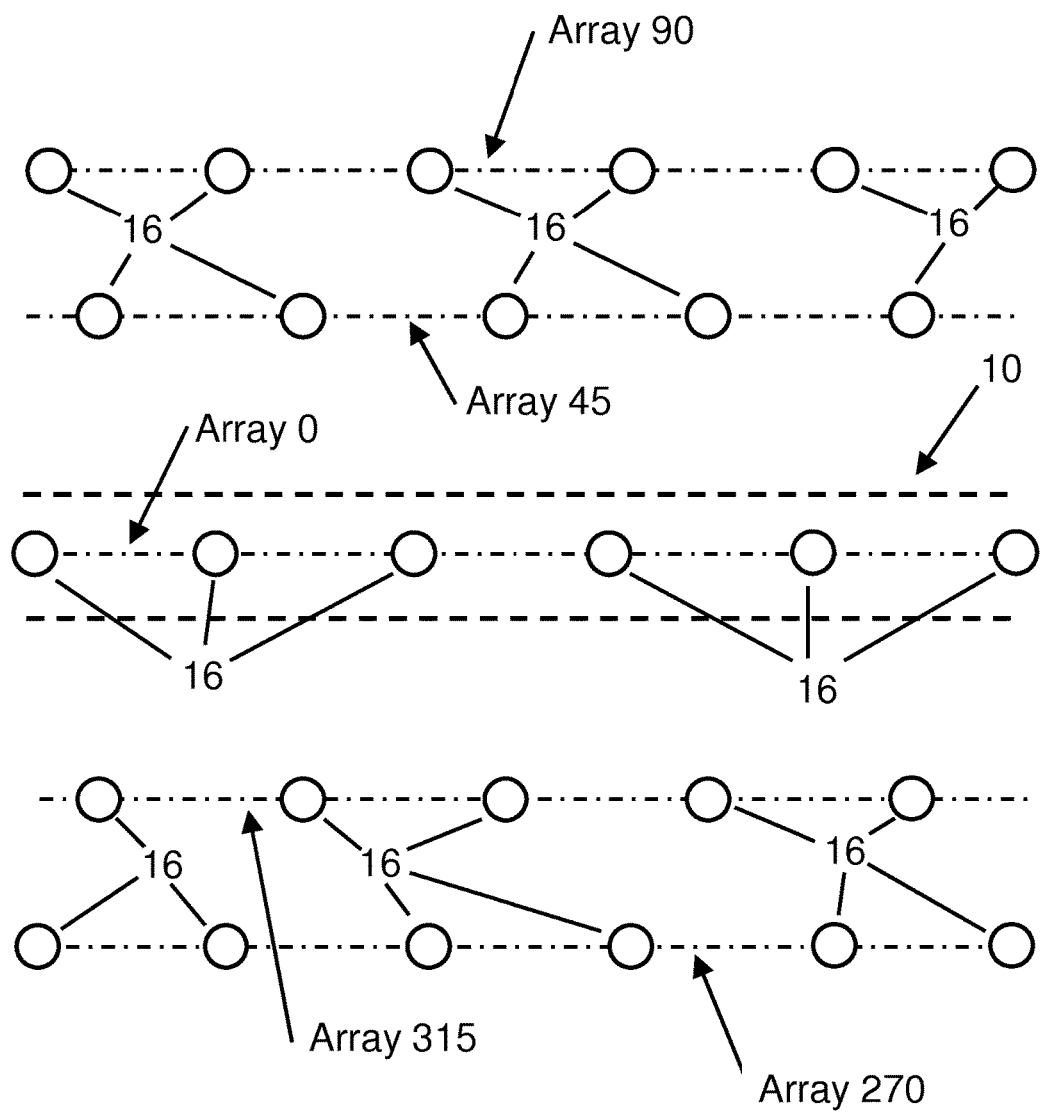
FIG. 6 shows a plan view of the system shown in FIG. 4 with generally spherical buried infrastructure excavation-sensing modules in place.

FIG. 6 shows a plan view of a buried pipe 10 with multiple linear arrays of generally spherical excavation-sensing modules arranged along the pipe axis and to each side of the pipe. The excavation-sensing modules emplaced along Array 0 are staggered from the excavation-sensing modules along Array 45 and Array 90. Although the excavation-sensing modules along each array are shown in linear alignment, it is certainly possible to stagger the alignment of the excavation-sensing modules to one side or the other of the axis of each array. As in FIG. 4, the exact number and positioning of the arrays will depend upon local conditions for the protection scenario and the perceived dangers involved with a possible breach of the buried infrastructure. For example, there well may be more arrays emplaced about a buried petroleum [oil, natural gas or gasoline, etc.] pipeline than might be emplaced about a water or sewer pipeline. This might be because of the perceived increased public threat resulting from potential breaches of a petroleum pipeline as opposed to breach of a water or sewer pipeline.

Figure 7:
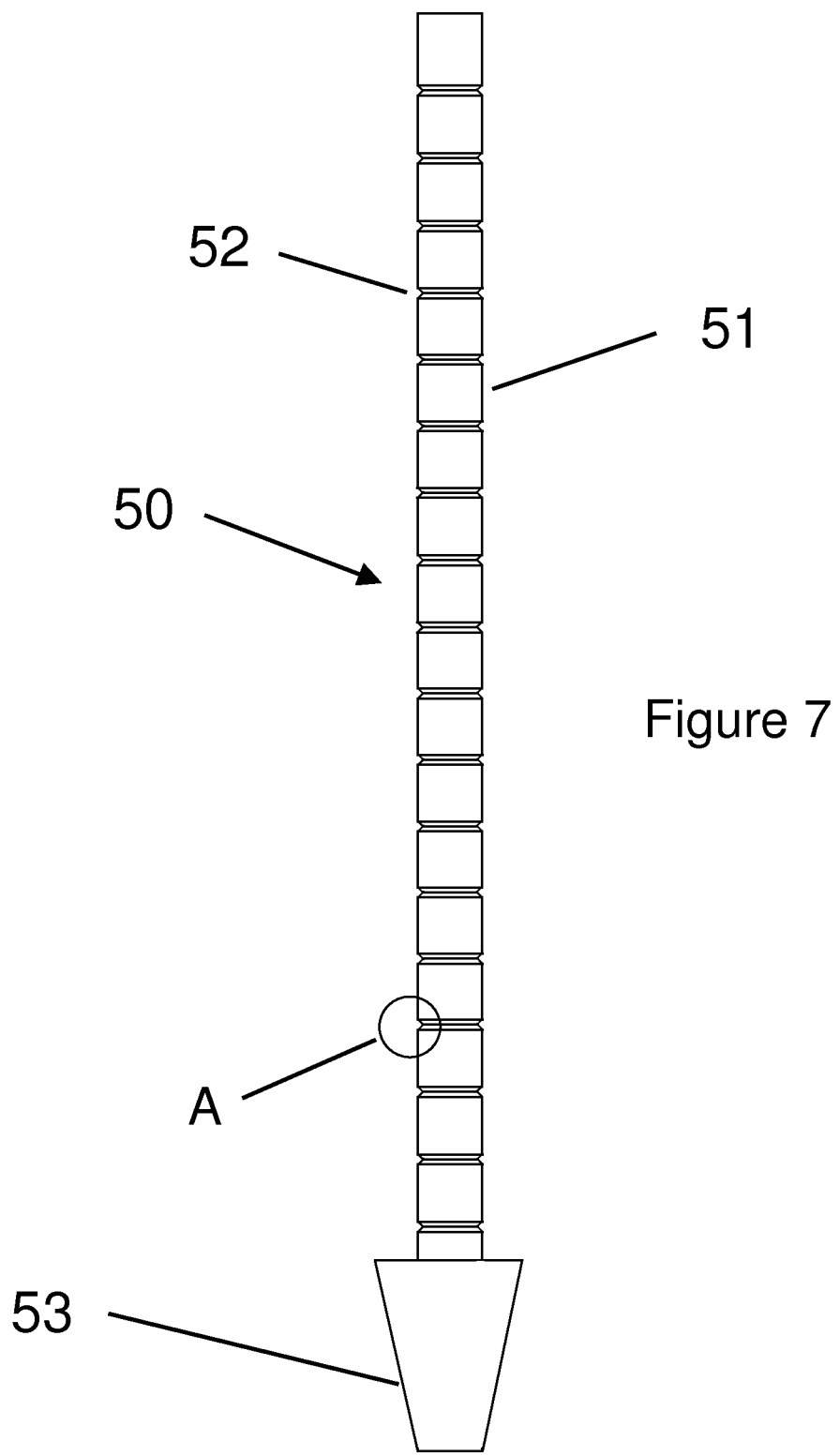
FIG. 7 shows an example of a first and preferred embodiment of the buried infrastructure excavation-sensing module of the present invention.

FIG. 7 shows a first embodiment of a buried infrastructure excavation-sensing module 50 comprising an elongated, hollow tube 51 which is closed at both ends and scored at multiple locations 52 along the length of the tube. Tube 51 can be of any desired length and/or diameter. Although many different materials may be used for the tube 51, it has been found that thermoplastic pipe works quite well. An embodiment which was tested and found to be satisfactory was made from standard PVC pipe. The tested embodiment had an internal diameter of 1.5 inches with triangular scores spaced at approximately 1.5 inches locations along the length of the tube. Scoring makes the tube predictably breakable by external force. Other scoring geometries are also possible. The exact length and diameter of the buried infrastructure excavation-sensing module will depend on many different factors as will be readily apparent to one skilled in the art. For example, the composition of the soil where the infrastructure is buried will certainly affect the sizing of the module as will the particular type of soil and the amount of rock present in the soil. Many other factors from the particular protection scenario such as the geometry of the buried infrastructure, the depth at which the infrastructure is buried, soil moisture, etc., etc. can also affect the sizing of the module and the module emplacement geometry. Also shown is optional anchor 52. The anchor is designed to make it harder for the excavation equipment to pull the bottom portion of the module out of the ground. As shown, the anchor is a flexible plastic cone that collapses during implanting the module, but will expand with any attempt to pull the module out of the ground. A plastic cone is shown herein, but other geometric configurations for anchor 52 are also possible, including multiple elements hinged to tube 51.

Figure 8:
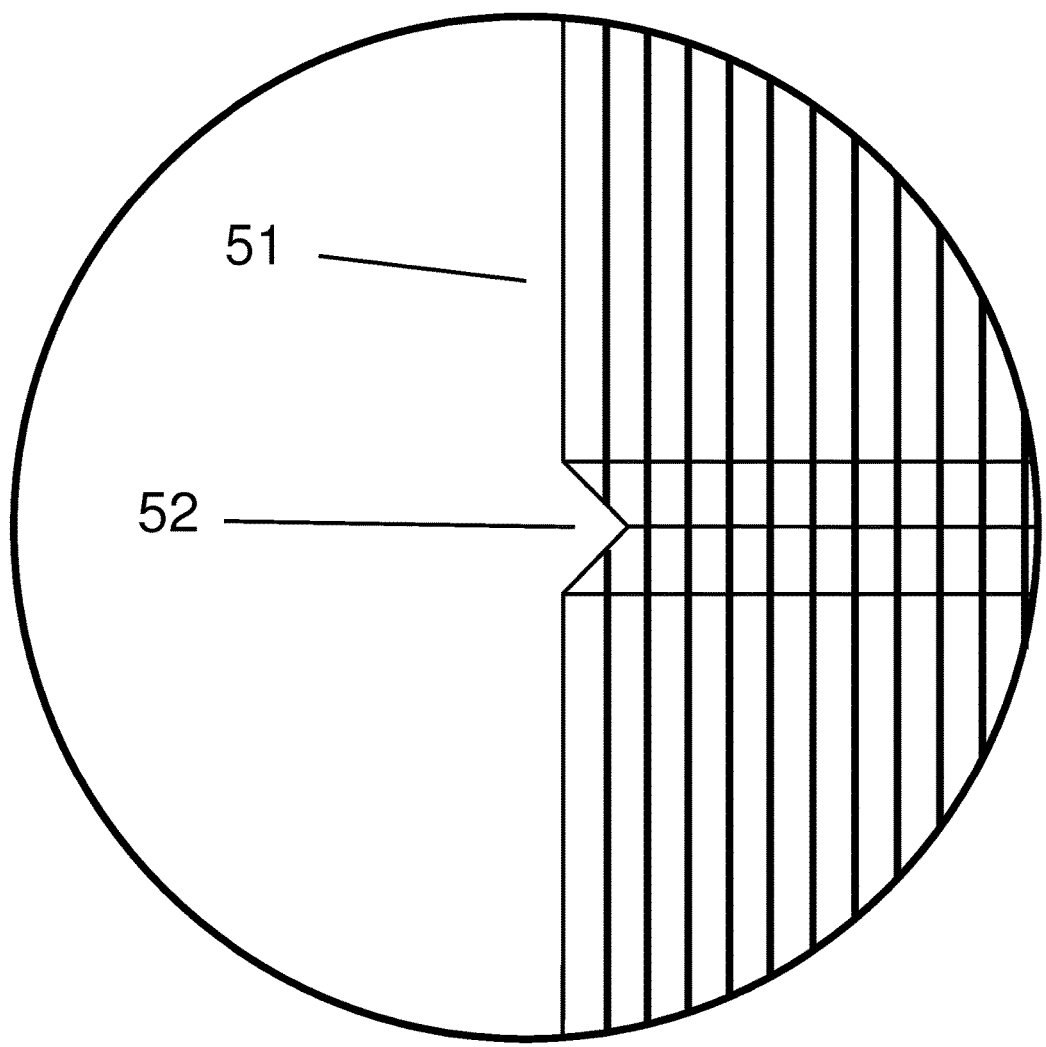
FIG. 8 shows an enlarged view of the portion A of FIG. 7.

FIG. 8 shows the portion of module 50 identified by the letter A in FIG. 7. Tube 51 is scored at multiple locations 52 along the length of tube 51. The score shown in FIG. 8 is triangular in cross-section, but other cross-sectional shapes can be used for score 52. In FIG. 8, tube 51 is shown as being colored Red for visibility purposes as shown by the vertical lines on tube 51. Other colors may also be used.

Figure 9:
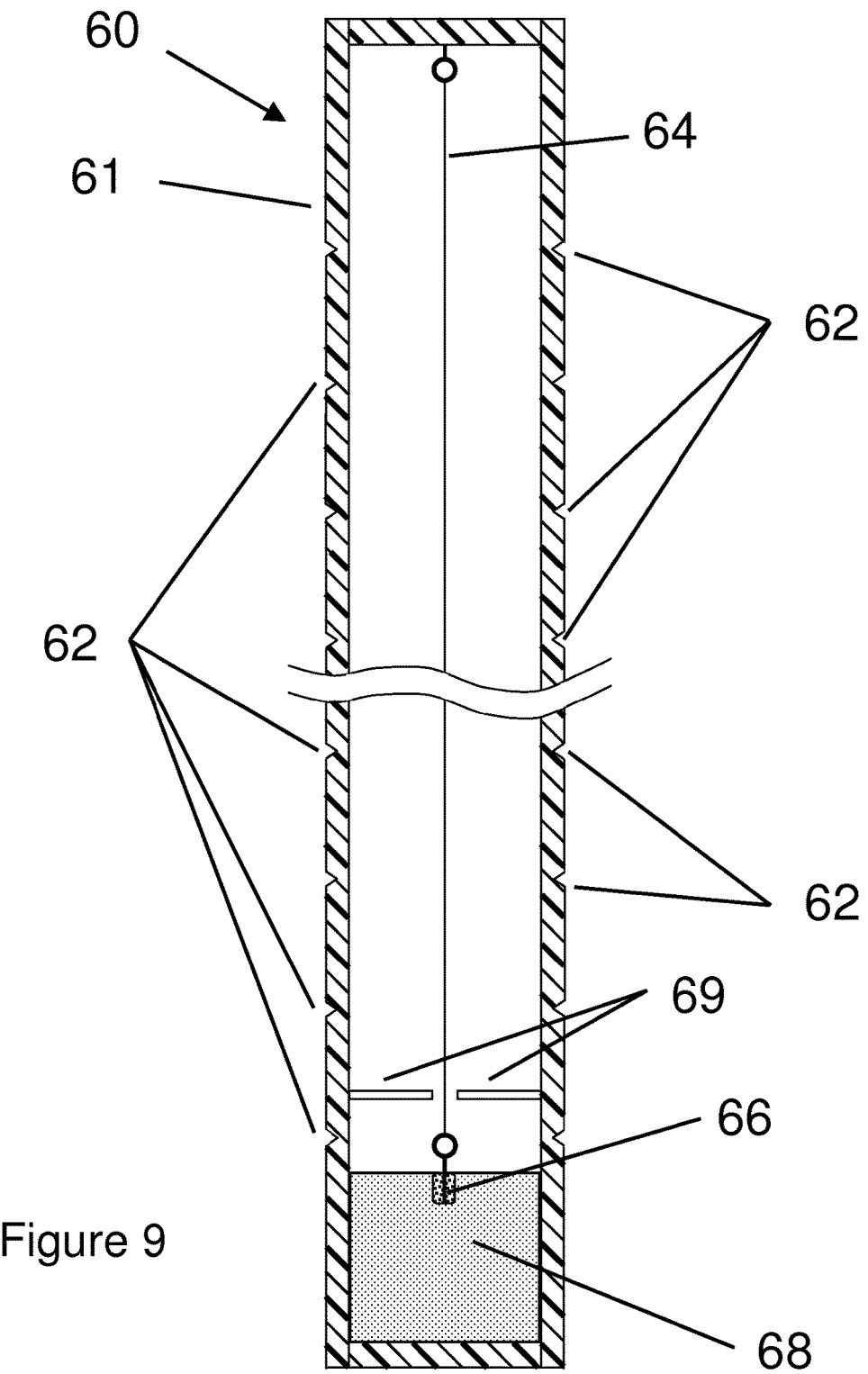
FIG. 9 shows a sectional view of the first embodiment of the buried infrastructure excavation-sensing module similar to that of FIG. 7. This embodiment has a single smoke generator.

FIG. 9 shows a cross-section of the embodiment of a buried infrastructure excavation-sensing module 60 shown in FIG. 7 comprising a closed cylindrical tube 61 that has several circumferential scores or notches 62 along its length and a smoke grenade 64 or other smoke-generating device mounted at one end of the interior of tube 61. The circumferential scores 62 are shown as triangular herein, but could have any other suitable geometry. These circumferential scores 62 are designed to weaken the tube 61 such that when excavation equipment (not shown) applies shear forces to tube 61, said tube will break along one or more circumferential scores 62. When tube 61 is broken, wire 64 will pull on igniter 66 of smoke grenade 68 causing smoke to be released from the broken end of tube 61. An optional whistling diaphragm 69 will create a loud sound as the smoke escapes. If desired, the whistling diaphragm 69 may be coated with an odorous substance that will provide a noticeable smell to the smoke. Alternatively, the smoke grenade or other smoke-generating device may be designed so that the smoke may have a noticeable odor.

Figure 10:
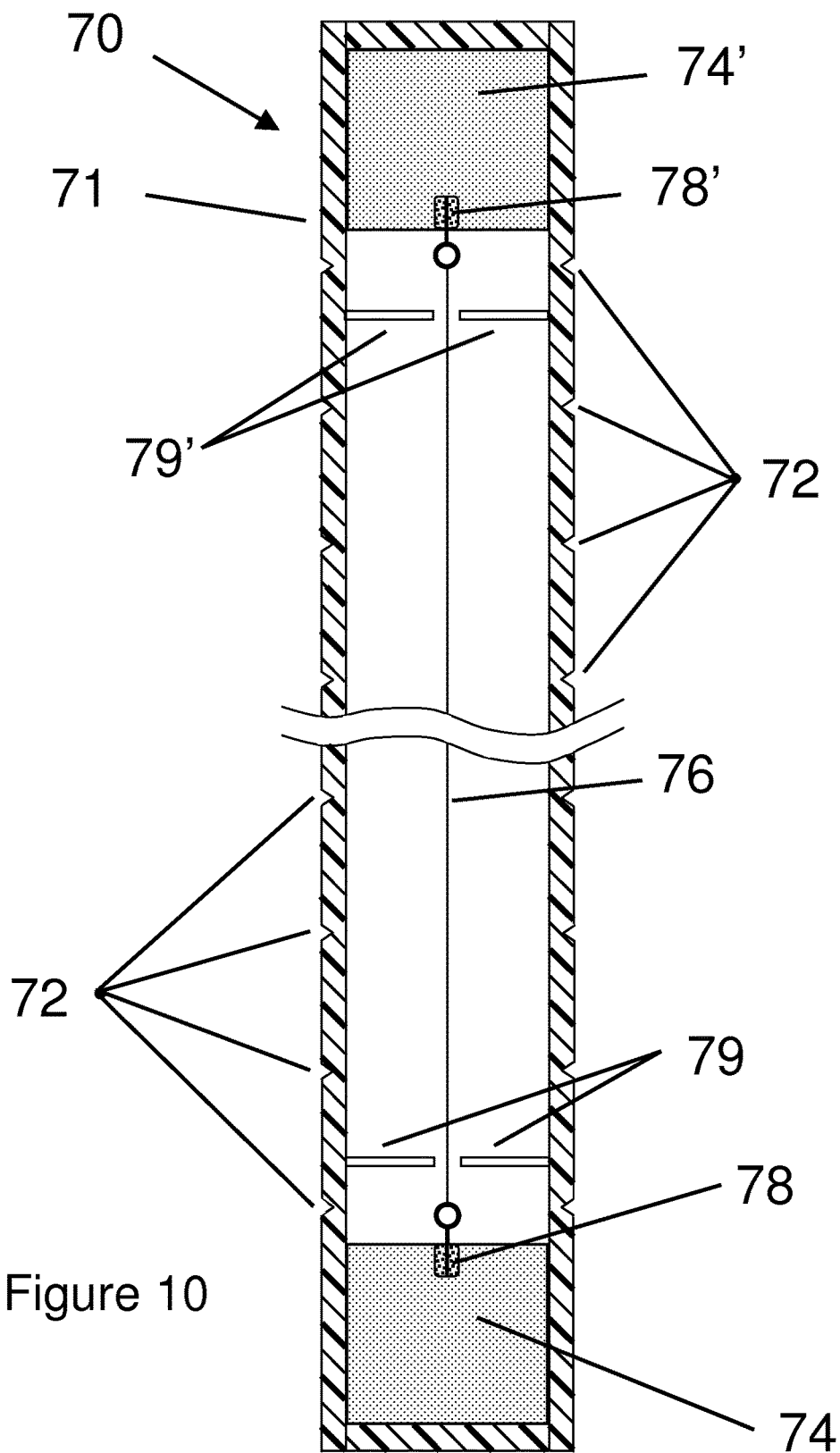
FIG. 10 shows a sectional view of a second embodiment of the buried infrastructure excavation-sensing module. This embodiment has two smoke generators

FIG. 10 shows a cross-section of a second embodiment of a buried infrastructure excavation-sensing module 70 comprising a closed cylindrical tube 71 that has several circumferential scores or notches 72 along its length and two smoke grenade 74, 74' or other smoke-generating devices mounted one at each end of the interior of tube 71. The circumferential scores 72 are shown as triangular herein, but could have any other suitable geometry. These circumferential scores 72 are designed to weaken the tube 71 such that when excavation equipment (not shown) applies shear forces to tube 71, said tube will break along one or more circumferential scores 72. When tube 71 is broken, wire 76 will pull on igniters 78, 78' of smoke grenades 74, 74' causing smoke to be released from both broken ends of tube 71. Optional whistling diaphragms 79, 79' will create a loud sound as the smoke escapes. If desired, the whistling diaphragms 79, 79' may be coated with an odorous substance that will provide a noticeable smell to the smoke. Alternatively, the smoke grenade or other smoke-generating device may be designed so that the smoke may have a noticeable odor. In most cases, the upper end of buried infrastructure excavation-sensing module 70 is contained in the excavation equipment bucket while the lower end of buried infrastructure excavation-sensing module 70 remains in the soil. This second embodiment provides two sources of smoke: one in the soil and one in the excavation equipment bucket to facilitate alerting the excavation crew.

Figure 11:
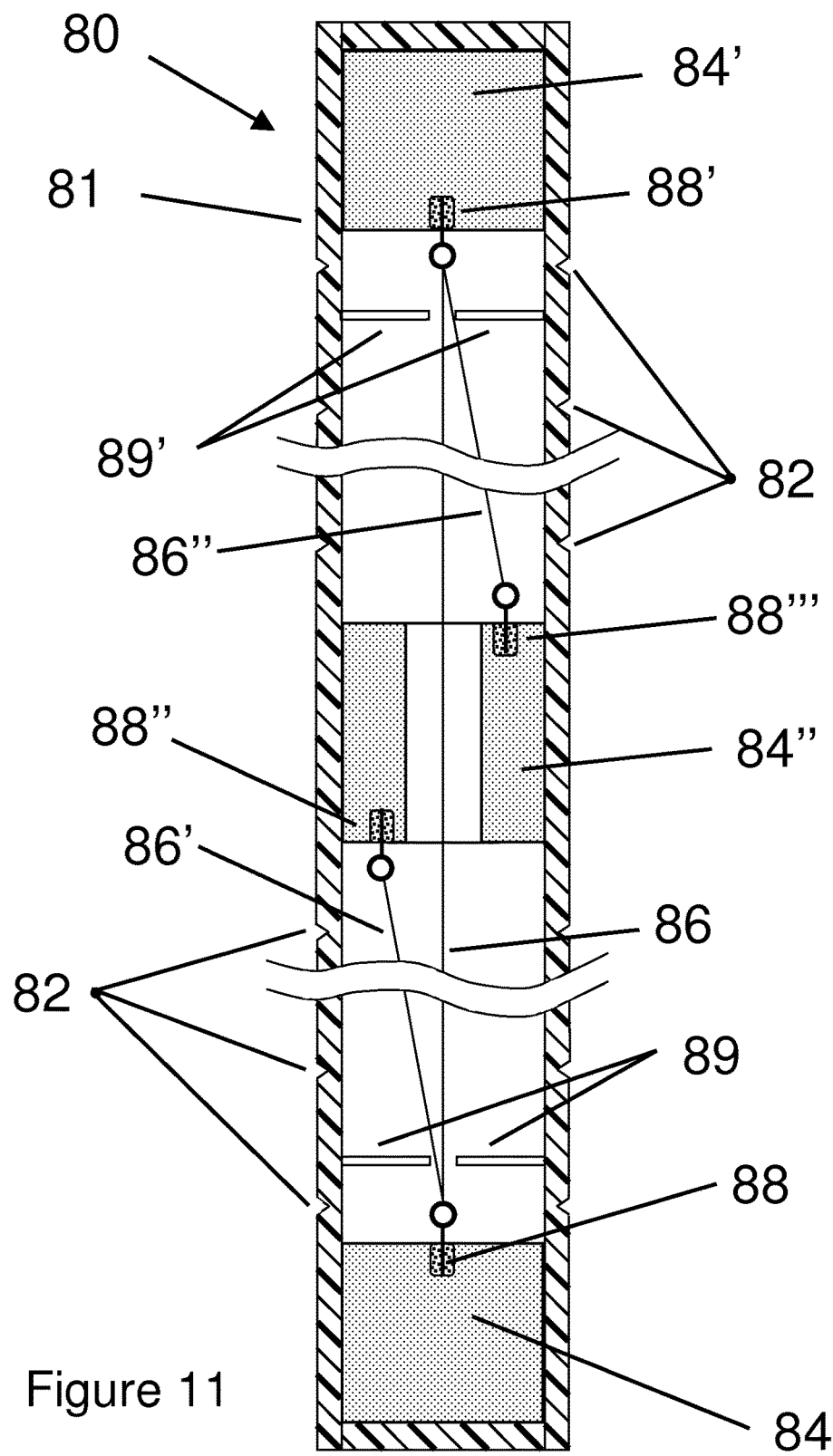
FIG. 11 shows a sectional view of a third embodiment of the buried infrastructure excavation-sensing module. This embodiment has three smoke generators.

FIG. 11 shows a cross-section of the third embodiment of a buried infrastructure excavation-sensing module 80 comprising a closed cylindrical tube 81 that has several circumferential scores or notches 82 along its length and three smoke grenade 84, 84', 84" or other smoke-generating devices mounted one at each end of the interior of tube 81 and one in the middle. It is possible to have more than three smoke grenades by replicating the middle portion of closed cylindrical tube 81 as many times as is needed. The circumferential scores 82 are shown as triangular herein, but could have any other suitable geometry. These circumferential scores 82 are designed to weaken the tube 81 such that when excavation equipment (not shown) applies shear forces to tube 601, said tube will break along one or more circumferential scores 610. When tube 81 is broken, wires 86, 86', or 86" will pull on igniters 88, 88', or 88" of smoke grenades 84, 84' or 84" causing smoke to be released from both broken ends of tube 81. Middle smoke grenade 84" is shown as an annulus to allow wire 86 to pass through it, but other configurations are possible. Optional whistling diaphragms 89, 89' will create a loud sound as the smoke escapes. If desired, the whistling diaphragms 89, 89' may be coated with an odorous substance that will provide a noticeable smell to the smoke. Alternatively, the smoke grenade or other smoke-generating device may be designed so that the smoke may have a noticeable odor. In most cases, the upper end of buried infrastructure excavation-sensing module 80 is contained in the excavation equipment bucket while the lower end of buried infrastructure excavation-sensing module 80 remains in the soil. This third embodiment provides three sources of smoke: one in the soil and one in the excavation equipment bucket and the third source in either the soil or the excavation equipment bucket depending on the exact fracture scenario to facilitate alerting the excavation crew; the use of three or more smoke grenades provide an increase in the smoke generated.

Figure 12:
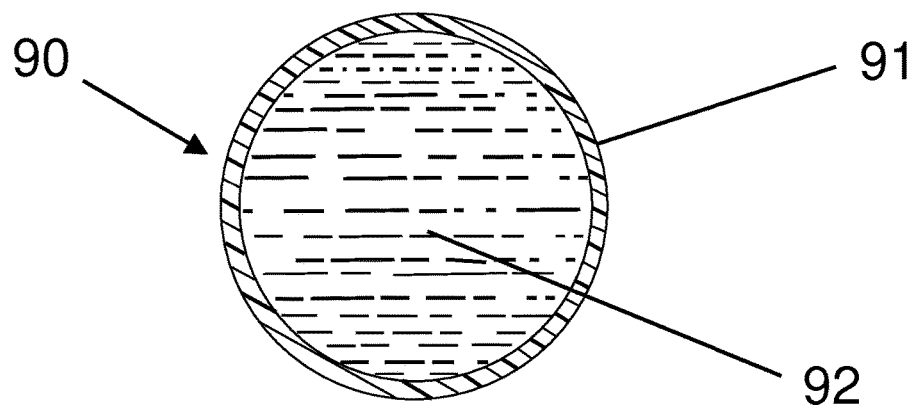
FIG. 12 shows a cross-section of a fourth embodiment of a buried infrastructure excavation-sensing module.

FIG. 12 shows a cross-section of a fourth embodiment of a buried infrastructure excavation-sensing module 90 comprising a gas-impermeable housing 91 that can be broken or ruptured by contact with construction equipment (not shown). The general configuration of excavation-sensing module 90 may be spherical or cylindrical as shown herein, or any other suitable shape. A compressed, colored and odorous gas 92 is contained in housing 91. A break in housing 91 will release colored, odorous gas 92, thus alerting construction personnel to the presence of the buried infrastructure. Housing 91 may be made of any suitable material such as a synthetic resin or plastic compound (as shown in the drawing) or a metallic substance. As an alternative to using a compressed, colored and odorous gas 92 within housing 91, it is possible to have a chemical compound contained within the housing 91 which will generate gas upon exposure to the atmosphere.

Figure 13:
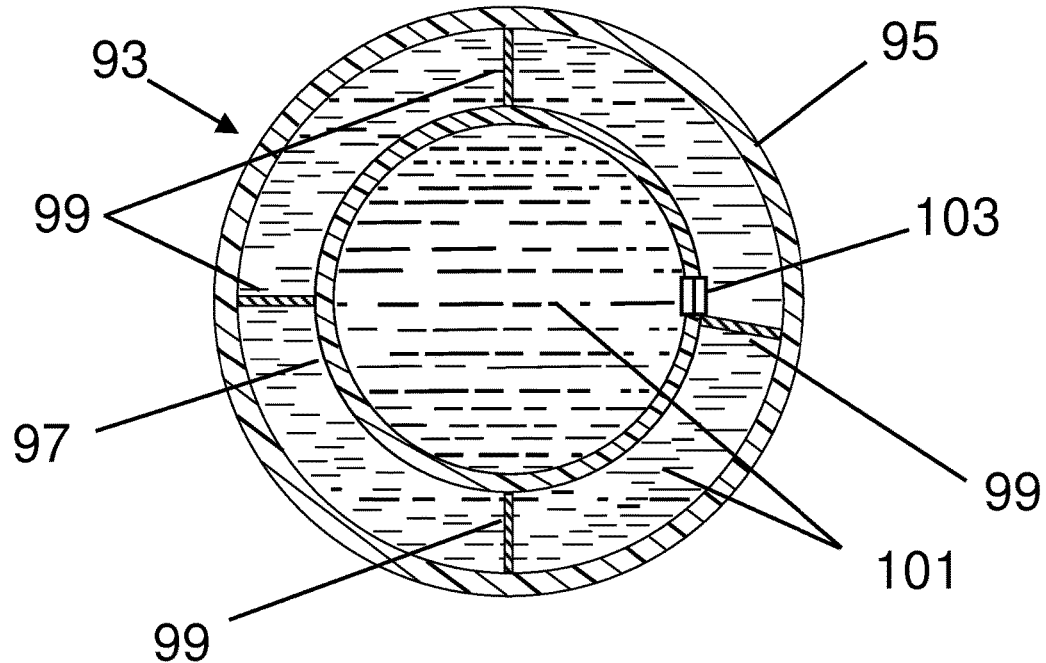
FIG. 13 shows a cross-section of a fifth embodiment of a buried infrastructure excavation-sensing module with an incorporated whistle.

FIG. 13 shows a cross-section of a fifth embodiment of a buried infrastructure excavation-sensing module 93 comprising a gas-impermeable outer housing 95 that can be broken or ruptured by construction equipment (not shown) and a second, inner gas-impermeable housing 97. As with the embodiment of FIG. 12, the general configuration of excavation-sensing module 93 may be spherical or cylindrical, as shown herein, or any other suitable shape. Housings 95 and 97 are held in spaced alignment by partitions 99. Both housings are filled with compressed, colored, odorous gas 101. The gas contained within housing 97 is at a higher pressure than the gas inside housing 95. A whistle 103 is mounted on inner housing 97, but is blocked by a friable diaphragm. When compressed, colored, odorous gas 101 is released from the outer housing 95 by an excavation-caused rupture, the gas inside housing 97 breaks the diaphragm causing the compressed, colored, odorous gas 101 to be released from inner housing 97 via whistle 103 thus generating a loud sound to alert the construction crew.

Figure 14:
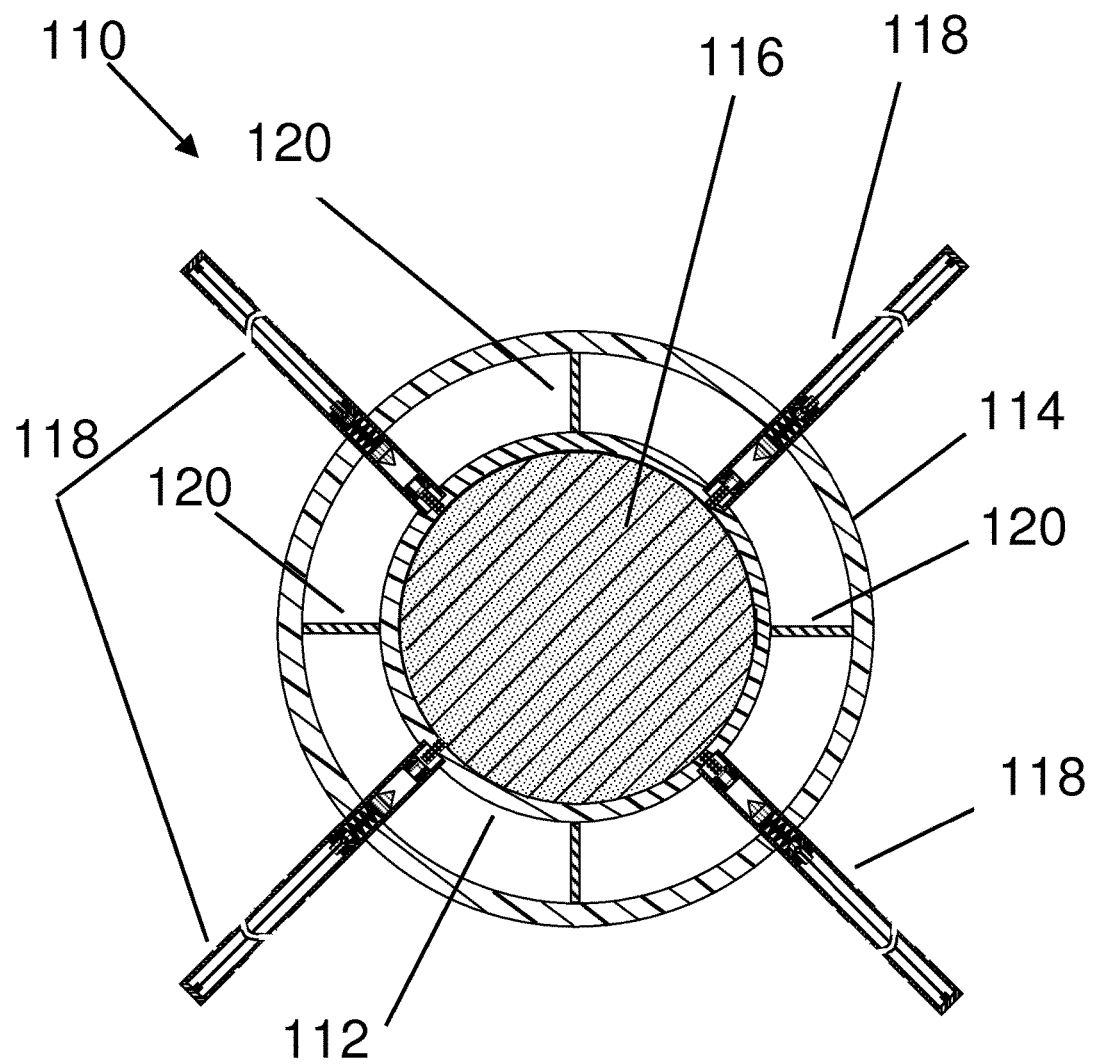
FIG. 14 shows a cross-section of a sixth embodiment of a buried infrastructure excavation-sensing module incorporating a gas generator with mechanical energy triggering.
Figure 15:
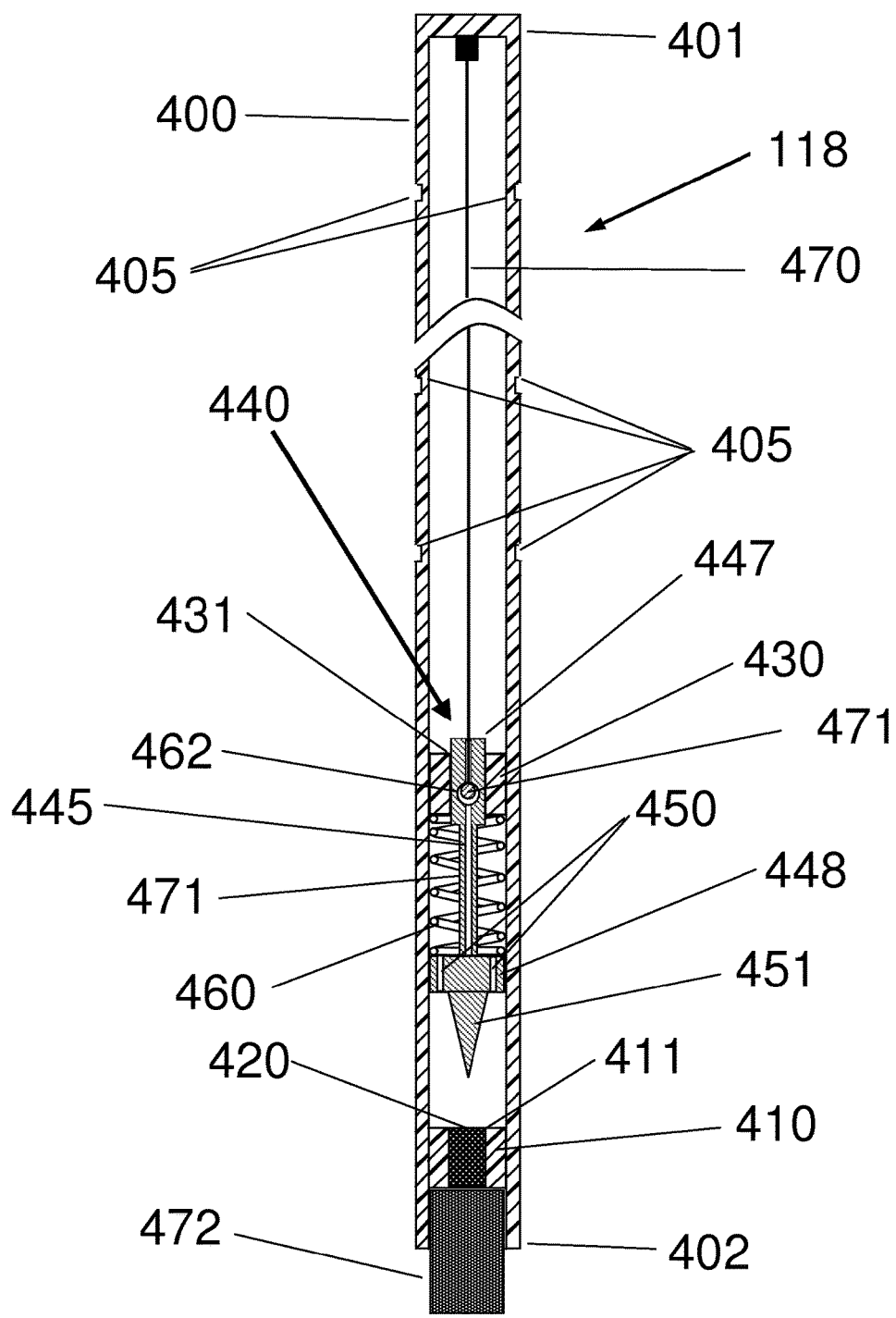
FIG. 15 shows a cross-section of the mechanical triggering mechanism for the excavation-sensing module of FIG. 14.

FIG. 14 shows a cross-section of a sixth embodiment of a buried infrastructure excavation-sensing module 110 comprising an inner housing 112 mounted within an outer housing 114. Housings 112 and 114 are held in spaced alignment by partitions 120. Inner housing 112 is a smoke generator. Solid compound 116 contained within inner housing 112 will generate large volumes of colored, odorous smoke when ignited. One or more triggers 118, are mounted on excavation-sensing module 110. Triggers 118 are shown in FIG. 15. When one or more of the triggers 118 is actuated the compound 116 is ignited and burns to produce large amounts of a colored, odorous gas.

FIG. 15 shows a cross-section of a trigger 118. Trigger 118 comprises an elongated, hollow cylindrical housing 400 which is deliberately weakened by a plurality of scorings 405 which reduce the thickness of housing 400 at selected locations to create a weakened housing. Housing 400 is closed at the upper end by cap 401 and open at the bottom end 402. A release cable 470 is securely fastened to the inside of the upper end 401 of housing 400. When the housing 400 is impacted by excavation equipment [not shown] the housing will easily break along one of the scorings 405. As the broken-off portion of housing 400 is pulled away from its initial position, the release cable will be pulled axially along housing 400 in the direction of cap 401. A lower shoulder 410 is attached to the inside of housing 400 at the proximal end of housing thereof. Lower shoulder 410 has a cylindrical bore 411 therein which holds a percussion cap or primer 420. An upper shoulder 430 is placed above lower shoulder 410. Upper shoulder 430 also has a cylindrical bore 431 therein. Firing pin assembly 440 is held within the cylindrical bore 431 in upper shoulder 430.

Firing pin assembly 440 comprises an upper hollow cylindrical portion 447 located at the distal end of the firing pin assembly 440, a lower solid cylindrical portion 448 located at the proximal end of firing pin assembly 440 and a middle hollow cylindrical portion 445 connecting upper cylindrical portion 447 and lower cylindrical portion 448. Lower cylindrical portion 448 has a pointed firing pin 451 attached to the distal end thereof. Lower cylindrical portion 448 has a plurality of bores 450 permitting gasses to pass through lower cylindrical portion 448. Bores 450 can be designed as whistles to produce a loud audible sound when gasses pass there through. Lower cylindrical portion 448 is slightly smaller in diameter than the inner diameter of elongated cylindrical housing 400 such that lower cylindrical portion 447 can slide easily inside housing 400. The diameter of upper cylindrical portion 447 is slightly less than the diameter of bore 431 in upper shoulder 430 such that upper cylindrical portion 447 can slide freely in the bore 431. The length of upper cylindrical portion 447 is slightly greater than the length of bore 431 in upper shoulder 430. The diameter of middle cylindrical portion 445 is somewhat smaller than the diameter of upper cylindrical portion 447 and considerably smaller than the diameter of lower cylindrical portion 448. Spring 460 biases the firing pin assembly 440 towards percussion primer 420.

Upper cylindrical portion 447 of firing pin assembly 440 is slotted longitudinally to form four jaws and grooved internally to form a spherical chamber 462. Chamber 462 receives a ball 471 fastened to the proximal end of the release cable 470. Upper cylindrical portion 447 is normally held within bore 431 of upper shoulder 430. Because the diameter of upper cylindrical portion 447 is only slightly less than the diameter of bore 431, the jaws made by the slots in upper cylindrical portion 447 are held together and the ball 471 cannot escape from spherical chamber 462. When impacted by excavation equipment [not shown], the broken-off portion of housing 400 will pull the release cable upwardly and thus pull the upper cylindrical portion 447 upwardly out of bore 431. As the upper cylindrical portion 447 clears bore 461, the forces imparted to the slotted jaws by ball 471 will spread the jaws apart, allowing the firing pin assembly to be released from release cable 470. When the jaws are released, they will close together again and upper cylindrical assembly 447 can again pass through bore 431. Since the firing pin assembly is biased downwardly by firing pin assembly spring 460, the firing pin assembly will be thrust downwards so that the pointed firing pin 451 will impact percussion cap or primer 420. When percussion cap or primer 420 is activated, it will ignite the booster charge 472 which is in contact with composition 40 and will thus cause the composition to ignite. The gas/smoke will escape via slots or holes in cylinder 448 designed to act as a whistle to generate an audible signal. The operation and design of the firing pin mechanism 440 of trigger 44 is very similar that of the standard US Army Firing Device, pull-release type, M3 shown in Department of the Army Technical Manual TM 9-1946.

Figure 16:
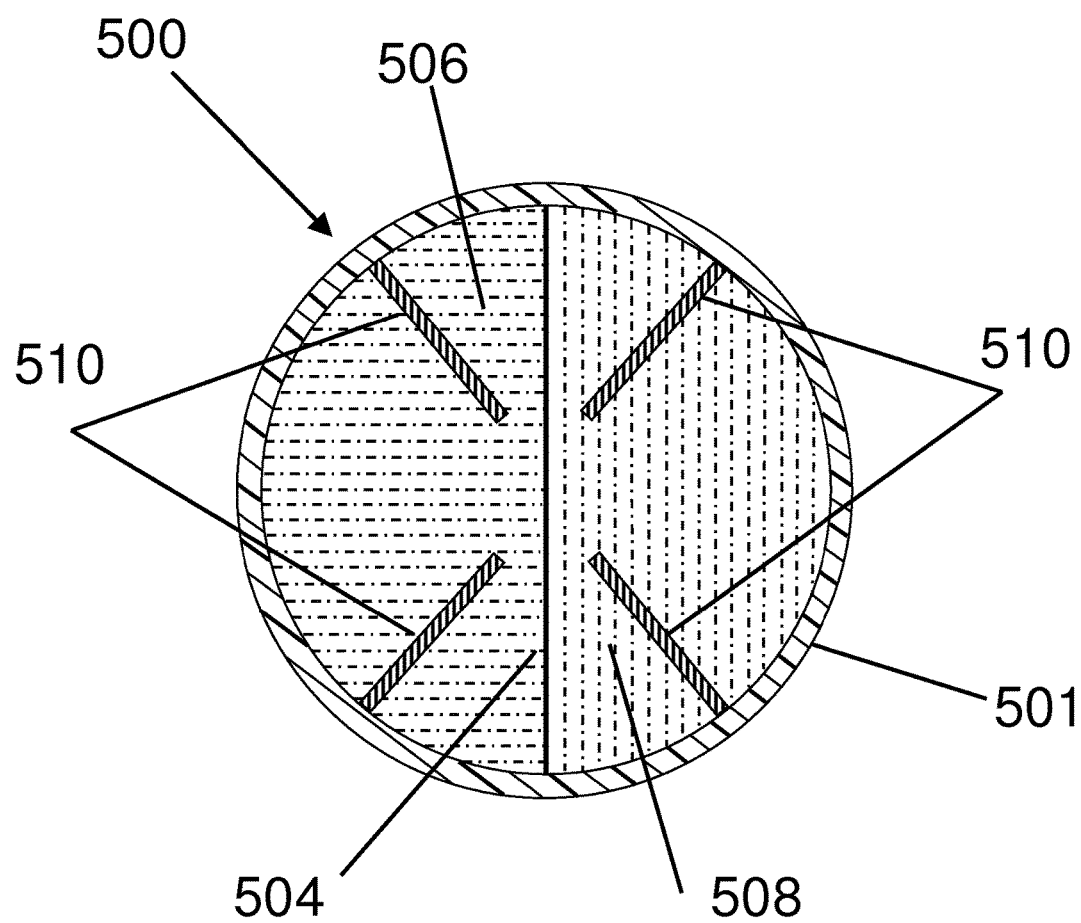
FIG. 16 shows a cross-section of a seventh embodiment of an excavation-sensing module utilizing the reaction of two admixed chemicals.

FIG. 16 shows a cross-section of a seventh embodiment of a buried infrastructure excavation-sensing module 500. This embodiment comprises a housing 501 bisected by a friable diaphragm 504. The two hemispheres formed by housing 501 and diaphragm 504 are separately filled with two chemicals 506 and 508 that when combined generate a visible gas. One or more strikers 510 are mounted on the interior surface of housing 501 so that one or more of strikers 510 will hit and break diaphragm 504 when the housing 501 is deformed by an excavation incident. The breaking of diaphragm 504 allows the two chemicals to react to create a plume of visible gas to alert the construction crew.

Figure 17:
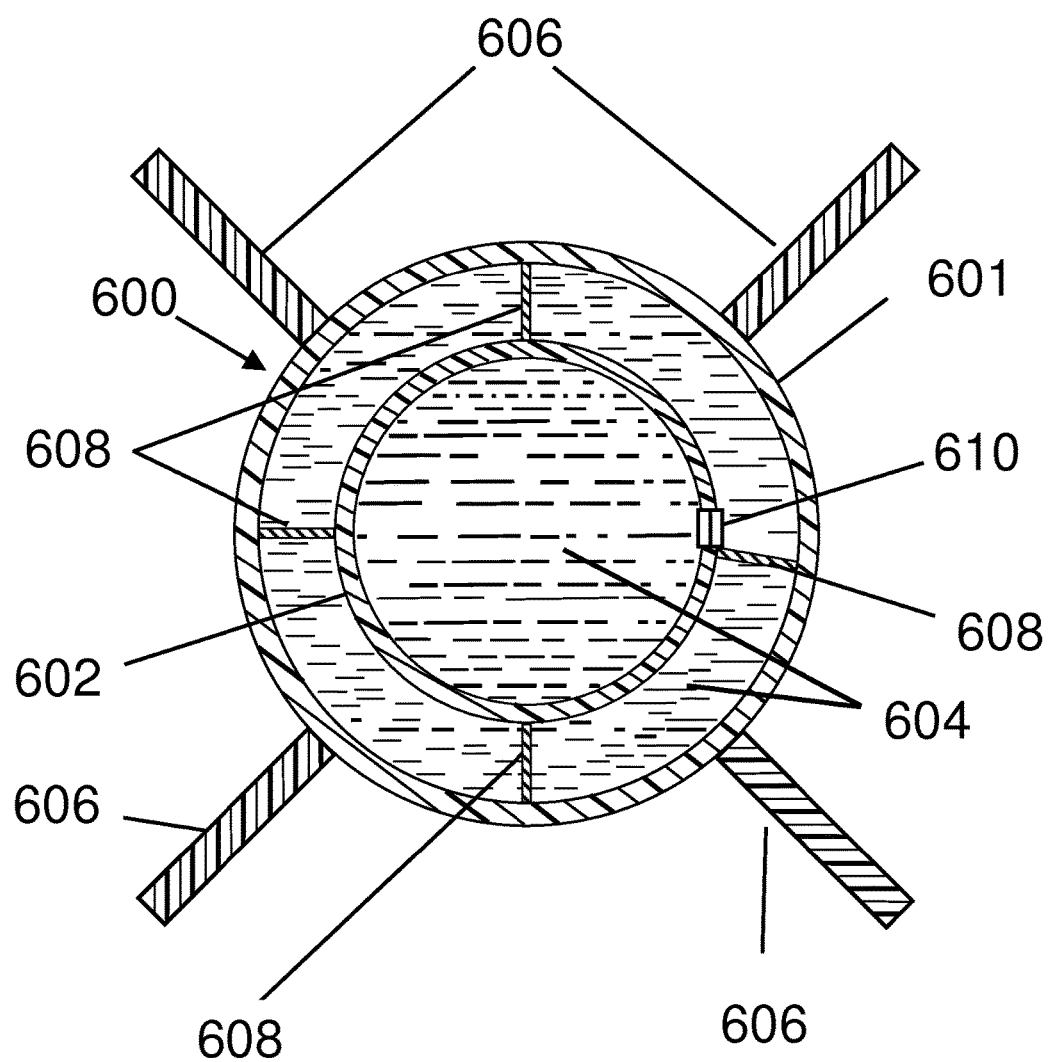
FIG. 17 shows a cross-section of a eighth embodiment of buried infrastructure excavation-sensing module that increases the effective alarm volume.

FIG. 17 shows a cross-section of an eighth embodiment of a buried infrastructure excavation-sensing module 600 comprising an outer housing 601 and inner housing 602; both of which contain compressed, colored, odorous gas 604. Outer housing 601 has one or more spikes or whiskers 606 rigidly mounted on to its exterior. Partitions 608 keep the inner and outer housings in alignment. A whistle 610 is mounted on inner housing 602 but is blocked by a friable diaphragm. When any of the spikes 606 are hit by excavation equipment, they will cause the outer housing 601 to rupture, thus releasing compressed gas 604 between the outer housing 601 and inner housing 602. As the gas escapes from the space between the outer and inner housing, the gas pressure in this space lowers to the point at which the diaphragm on inner housing 602 breaks. This causes the compressed, colored, odorous gas 604 to be released from inner housing 602 via whistle 610 thus generating both a loud sound and a cloud of colored, odorous gas to alert the construction crew.

Figure 18:
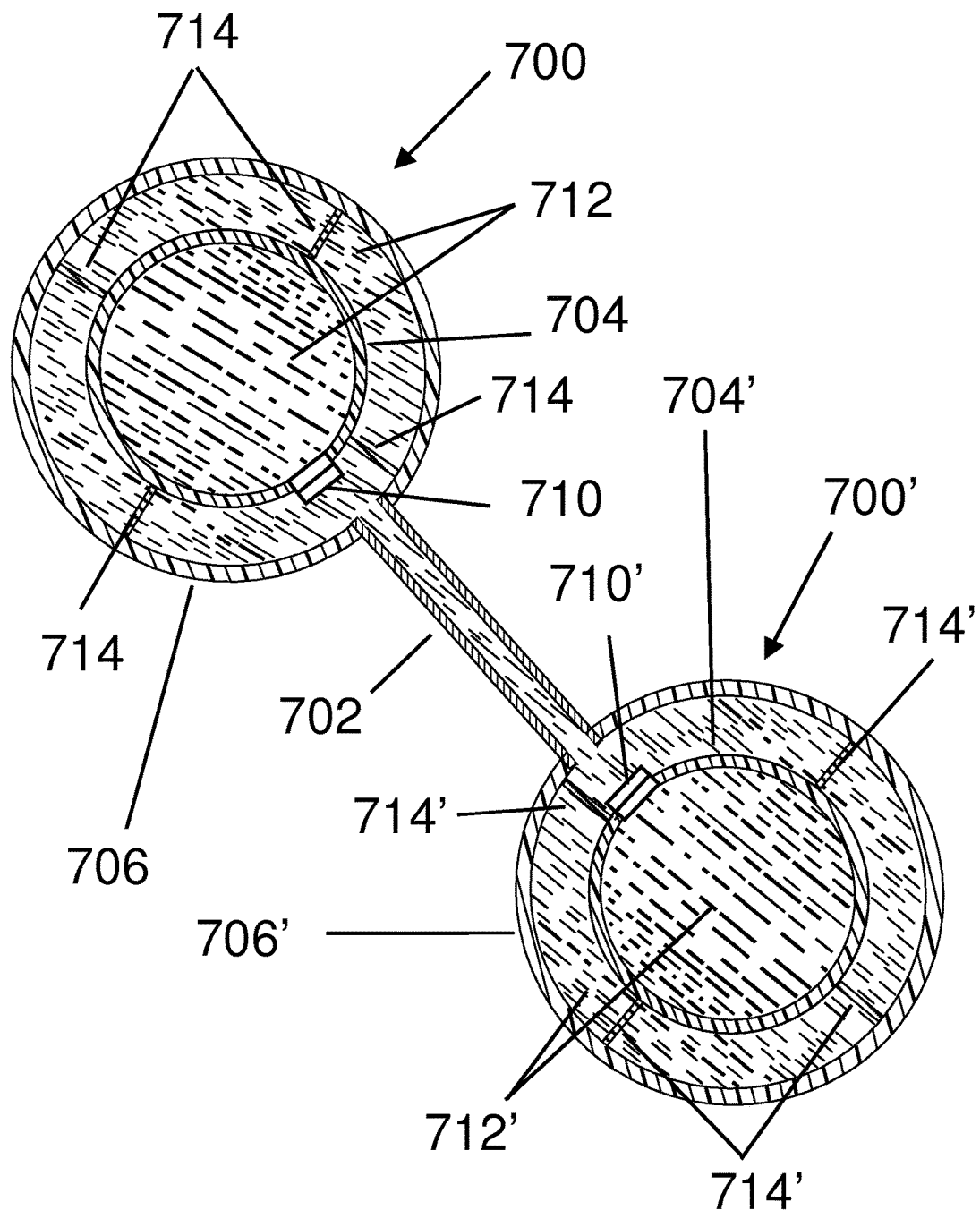
FIG. 18 shows a cross-section of a ninth embodiment of the excavation-sensing module of the invention comprising two individual modules coupled by flexible tubing.

FIG. 18 shows a cross-section of a ninth embodiment of the invention. Two buried infrastructure excavation-sensing modules 700, 700' are coupled together with flexible tubing 702. Each excavation-sensing module 700, 700' is similar to excavation-sensing module 93 shown in FIG. 13. Each buried infrastructure excavation-sensing module unit 700, 700' comprises an inner housing 704, 704' and an outer housing 706, 706'. Outer housings 706, 706' are maintained in a spaced relationship with inner housings 704, 704' through the action of spacers 714, 714'. The inner and outer housings are filled with a compressed, colored and odorous gas 712, 712' with the gas inside the inner housing being at a higher pressure than the gas in the outer housing. A whistle 710, 710' is mounted on inner housing 704, 704', but is blocked by a friable diaphragm. The flexible tubing 702 and the outer housings 706, 706' are connected so that they constitute one volume for the compressed visible gas. When the tubing 702 or either outer housing 706, 706' are ruptured, the friable diaphragm breaks and the compressed visible gas 712, 712' in the inner housings 704, 704' escapes through whistle 710, 710' and through the exposed tubing 702.

Figure 19:
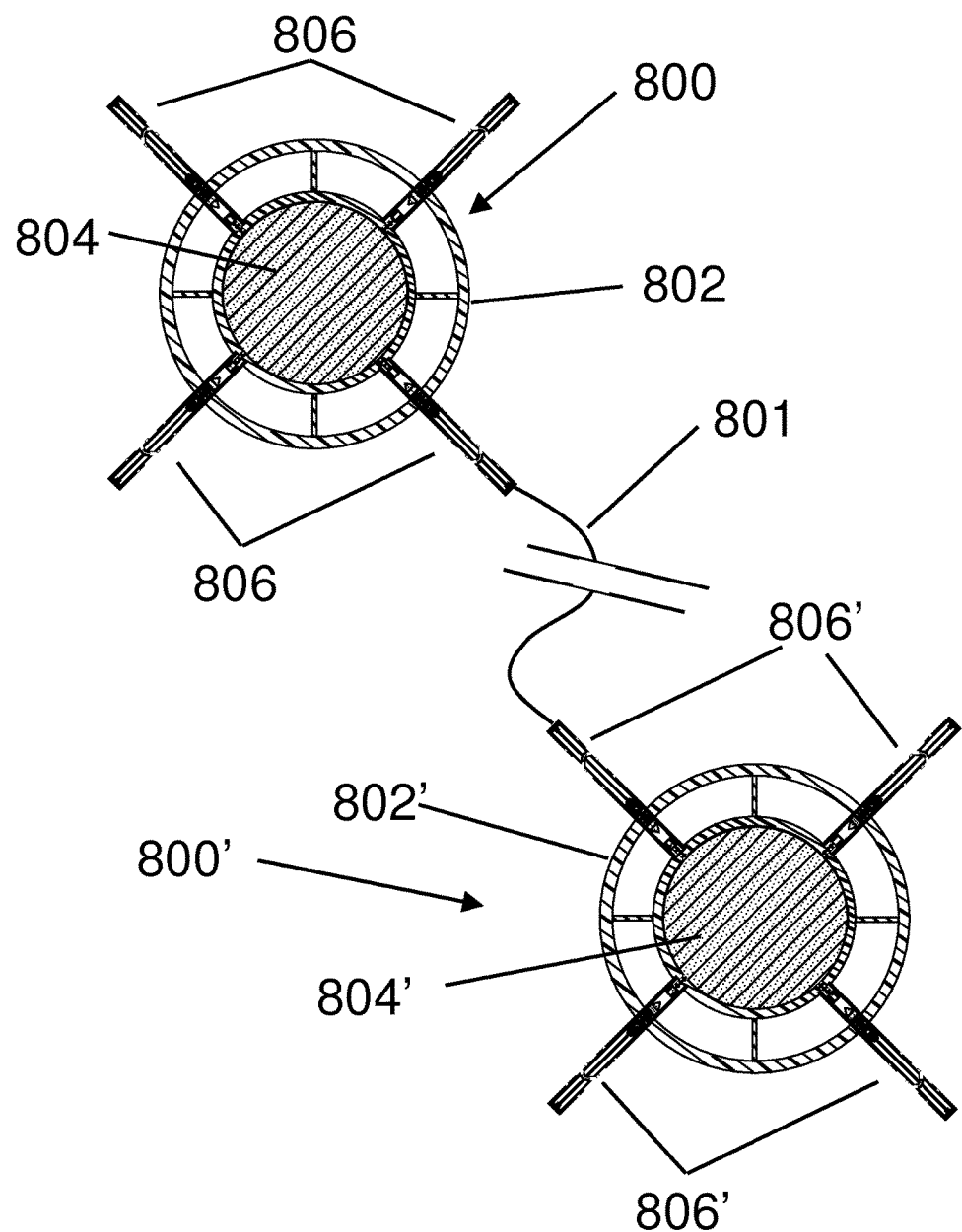
FIG. 19 shows a cross-section of a tenth embodiment of the excavation-sensing module of the invention comprising two buried infrastructure modules coupled by a cable.

FIG. 19 shows a cross-section or a tenth embodiment of the invention. Two buried infrastructure excavation-sensing modules 800, 800' are coupled together with cable 801. Each excavation-sensing module 800, 800' is similar in construction to excavation-sensing module 110 shown in FIG. 14. The buried infrastructure excavation-sensing modules 800, 800' comprise a housing 802, 802' enclosing a smoke generator 804, 804'. One or more triggers 806, 806' are mounted on outer housing 802, 802'. When one or more of the triggers 806, 806' is activated by excavation damage, the smoke generator 804, 804' in the excavation-sensing module associated with the activated trigger is ignited. Cable 801 is securely connected to the outer portion of a trigger 806 on excavation-sensing module 800 and another trigger 806' on excavation-sensing module 800'. When cable 801 is pulled as a result of excavation damage, it will activate the two triggers that it is attached to by rupturing/breaking the housings of the triggers. This, in turn will activate the smoke generator in both excavation-sensing module modules 800, 800'. Activation of one or more of the smoke generators 804, 804' will create a plume of colored smoke to alert the construction crew.

Figure 20:
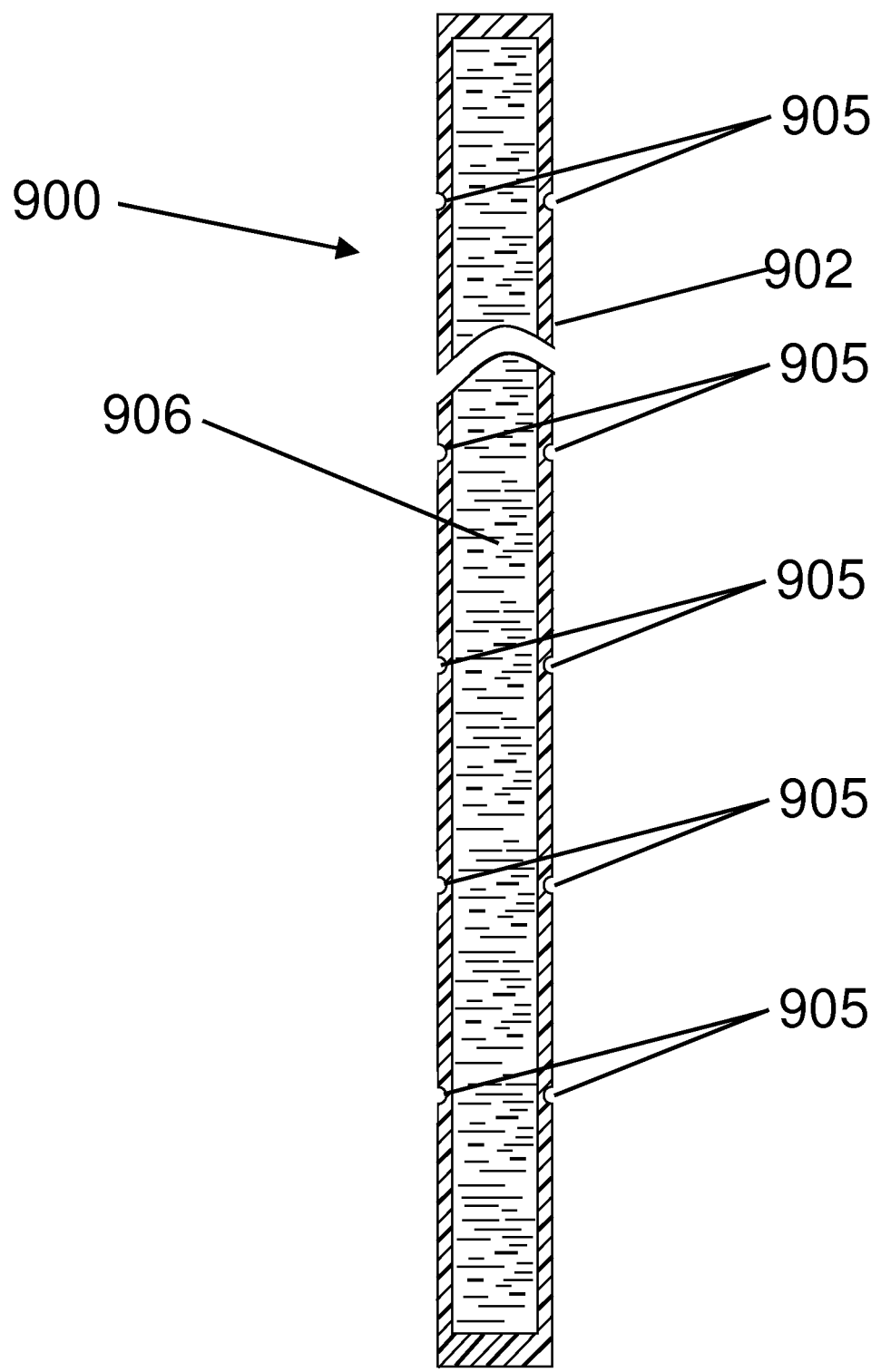
FIG. 20 shows a cross-section of an eleventh embodiment of a buried infrastructure excavation-sensing module.

FIG. 20 shows a cross-section of an eleventh embodiment of a buried infrastructure excavation-sensing module 90 comprising an elongated housing 902 which is closed at both top and bottom ends and scored by a plurality of circular scoring rings 905 to weaken the housing. Housing 902 is filled with a compressed, colored, odorous gas 906. When housing 902 is broken or ruptured by excavation damage, the compressed, colored, odorous gas escapes thus creating a cloud of colored, odorous gas to alert the construction crew to the presence of the buried infrastructure.

Figure 21:
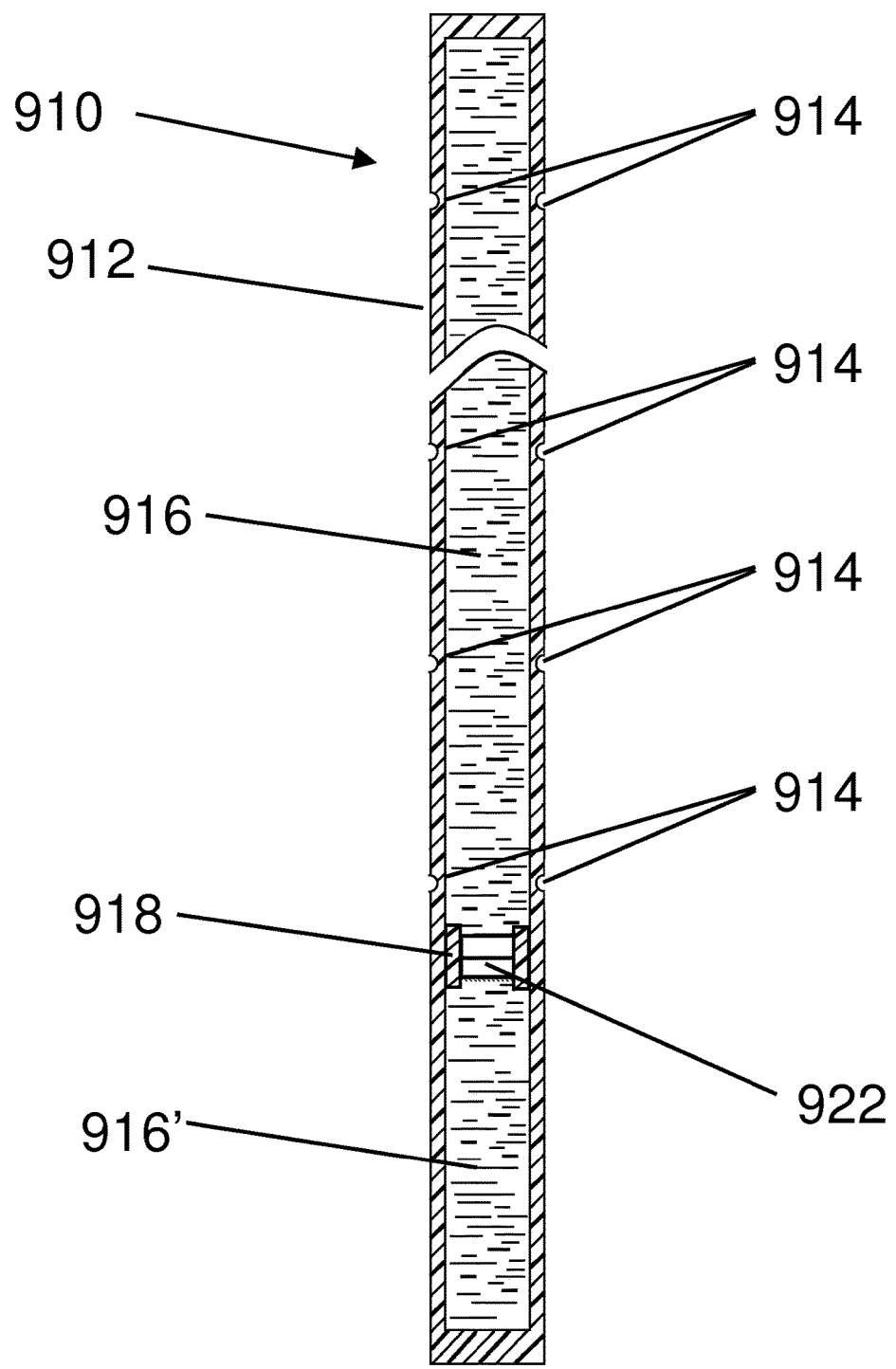
FIG. 21 shows a cross-section of a twelfth embodiment of a buried infrastructure excavation-sensing module. This embodiment incorporates a whistle.

FIG. 21 shows a cross-section of a twelfth embodiment of a buried infrastructure excavation-sensing module 910 similar in construction to excavation-sensing module 900 shown in FIG. 20. The excavation-sensing module 910 comprises a housing 912 which is closed at both ends and weakened by a plurality of circular scoring rings 914 to weaken the housing 912. It is understood that the scoring rings can have different geometries, such as the triangular scores of FIGS. 7 and 8. Shoulder 918 is located in the lower portion of housing 912 and contains whistle 922 which is closed by a friable diaphragm. Housing 912 is filled with a compressed, colored, odorous gas 916 at a first pressure and gas 916' at a second pressure in the portion of the housing 912 below the friable diaphragm. The compressed, colored, odorous gas 916' in the portion of housing 912 below whistle 920 is under a higher pressure than that of gas 916 so that when housing 912 is broken or ruptured in the upper portion by excavation damage, the friable diaphragm breaks and allows the higher pressure gas 916' to escape through whistle 922. This creates both a cloud of colored, odorous gas and a loud noise to alert the construction crew to the presence of the buried infrastructure.

Figure 22:
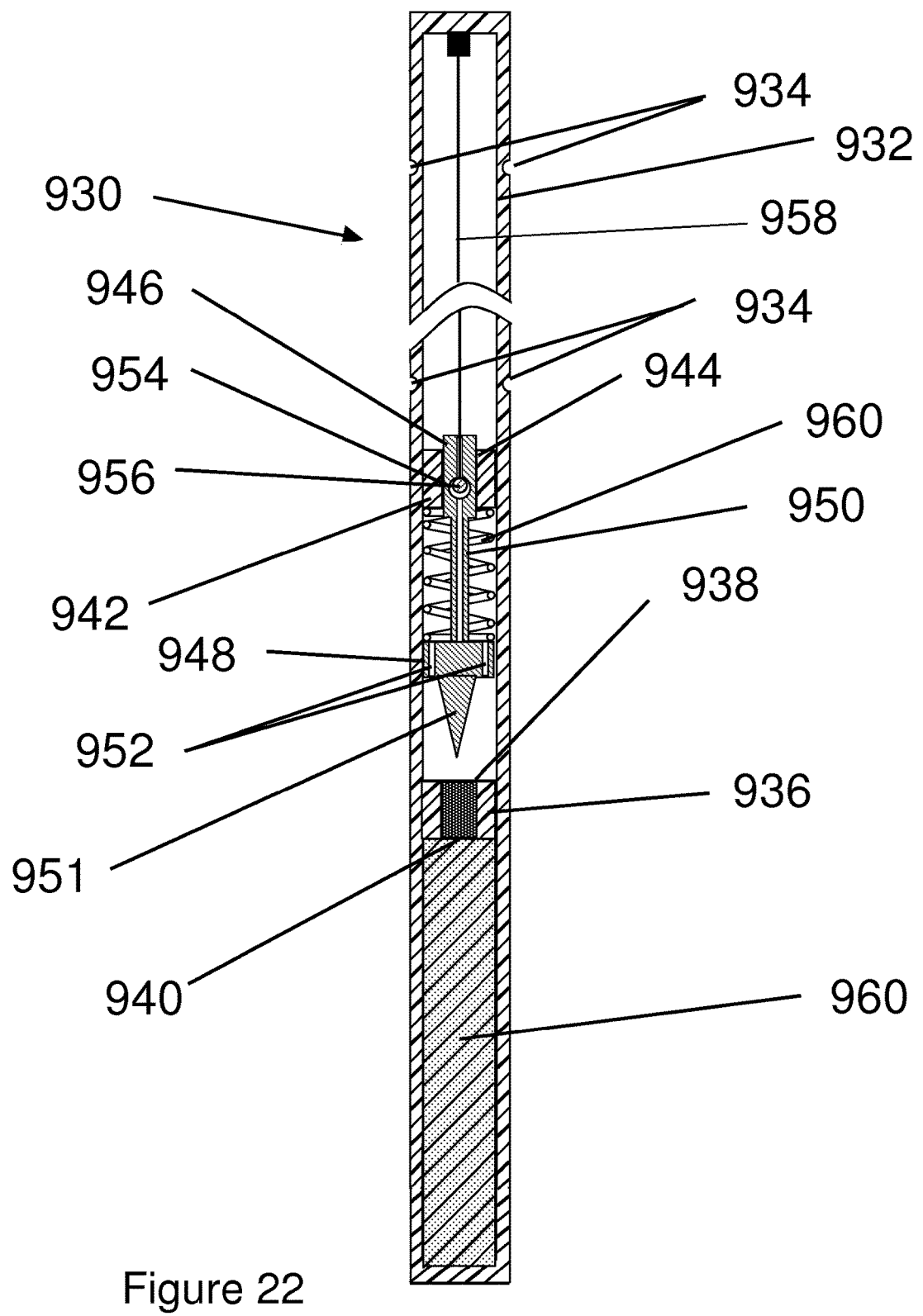
FIG. 22 shows a cross-section of a thirteenth embodiment of a buried infrastructure excavation-sensing module.

FIG. 22 shows a cross-section of a thirteenth embodiment of a buried infrastructure excavation-sensing module 930 comprising an elongated, hollow housing 932 which is weakened by a plurality of circular scoring rings 934. Lower shoulder 936 is in the lower portion of housing 932. Lower shoulder 936 has a bore 938 which houses a percussion cap or primer 940. Upper shoulder 942 is located in housing 932 above lower shoulder 936 and has a bore 944 therein. A firing pin assembly is held within upper shoulder 942. The firing pin assembly comprises an upper cylindrical body 946, a lower cylindrical body 948 and a middle cylindrical body 950. The diameter of upper cylindrical body 946 is such that it can slide freely in bore 944. The diameter of lower cylindrical body 948 is such that it can snugly fit and slide within the inner bore of housing 902. Lower cylindrical body 948 has a striker pin 951 on the lower portion thereof. A plurality of bores 952 are provided in lower cylindrical body 948 which permit gas to pass through the lower cylindrical body 948. Bores 952 may be constructed as whistles to provide a loud, audible sound when gas passes through the bores. The diameter of middle cylindrical body portion 950 is significantly less than the diameter of lower cylindrical body portion 948 and somewhat less than the diameter of upper cylindrical body portion 946.

Upper cylindrical portion 946 of the firing pin assembly is slotted longitudinally to form four jaws and grooved internally to form a spherical chamber 954. Chamber 954 receives a ball 956 fastened to the proximal end of the release cable 958. Upper cylindrical portion 946 is normally held within bore 944 of upper shoulder 942. Because the diameter of upper cylindrical portion 946 is only slightly less than the diameter of bore 944, the jaws made by the slots in upper cylindrical portion 946 are held together and the ball 956 cannot escape from spherical chamber 954. When impacted by excavation equipment [not shown] the broken-off portion of housing 932 will pull the release cable 958 upwardly and thus pull the upper cylindrical portion 946 upwardly out of bore 944. As the upper cylindrical portion 946 clears bore 944, the forces imparted to the slotted jaws by ball 956 will spread the jaws apart, allowing the firing pin assembly to be released from release cable 958. When the jaws are released, they will close together again and upper cylindrical assembly 946 can again pass through bore 944.

Since the firing pin assembly is biased downwardly by firing pin assembly spring 960, the firing pin assembly will be thrust downwards so that the pointed striker pin 951 will impact percussion cap or primer 940. When percussion cap or primer 940 is activated, it will ignite the composition 960 and will thus cause the composition to ignite thus creating a cloud of colored, odorous gas to alert the construction crew to the presence of the buried infrastructure.

Figure 23:
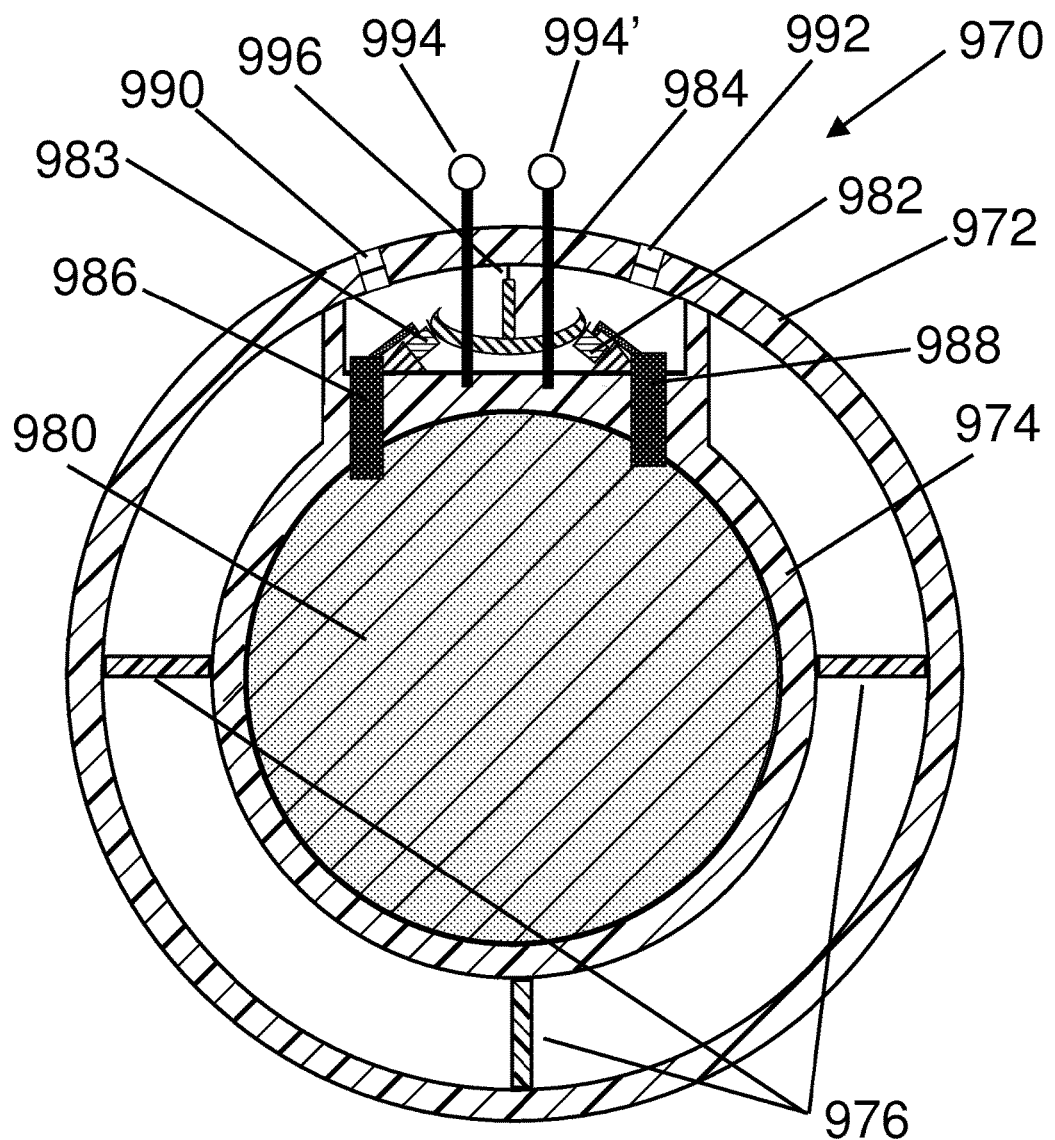
FIG. 23 shows a cross-section of a fourteenth embodiment of a buried infrastructure excavation-sensing module. This embodiment incorporates a pendulum trigger assembly.

FIG. 23 shows a cross-section of a fourteenth embodiment of a buried infrastructure excavation-sensing module 970 comprising a spherical outer housing 972 and a spherical inner housing 974. The two housings are held in spaced alignment by partitions 976 and the configuration of the upper portion of inner housing 974. Composition 980 is contained in the inner portion of inner housing 974 and will generate an intense cloud of colored, odorous smoke when ignited. Triggers 982 and 983 are mounted within the upper portion of inner housing 974. Even though only two triggers are shown in FIG. 23, it is envisaged that there may be three or perhaps more triggers equally spaced about the circumference of the pendulum weight 984. More triggers will make the excavation-sensing module 970 even more sensitive to rotation about different axis.

When either trigger 982, 983 is activated, it ignites a fuse train 986, 988 which in turn ignites compound 980. The triggers are actuated by a pendulum weight 984 in the general shape of a mushroom boat anchor. Bores 990 and 992 are provided in outer spherical housing 972 to allow the smoke generated by compound 980 to escape. Bores 990 and 992 are closed by a friable diaphragm which serves to keep soil and moisture out of the interior of the excavation-sensing module, but which will rupture when the compound 980 ignites and fills the interior of the spherical housing 972 with smoke under pressure.

Pendulum weight 984 is suspended by a small wire 996 from the inner surface of outer spherical housing 972. The pendulum weight is held in place for emplacement by safety rods 994, 994' which are withdrawn after emplacement by wires [not shown]. When the safety rods 994, 994' are removed after the excavation-sensing module 970 is emplaced, the pendulum weight 984 is free to swing in any direction in response to a tumbling moment applied to the excavation-sensing module 970 by excavation damage. As better illustrated in FIG. 24, when the pendulum 984 swings to one side, it releases the actuating rod of trigger 982, 983 permitting the trigger mechanism to fire and ignite fuse train 986, 988. This, in turn, ignites composition 980 and creates an intense cloud of colored, odorous smoke which will escape from the inner spherical housing 974 by way of the holes left when the fuse train 986, 988 burns through. The smoke will build up on the inside of spherical housing 972 until there is enough pressure to rupture the diaphragms in bores 990 and 992 and then escape to the outside.

Figure 24:
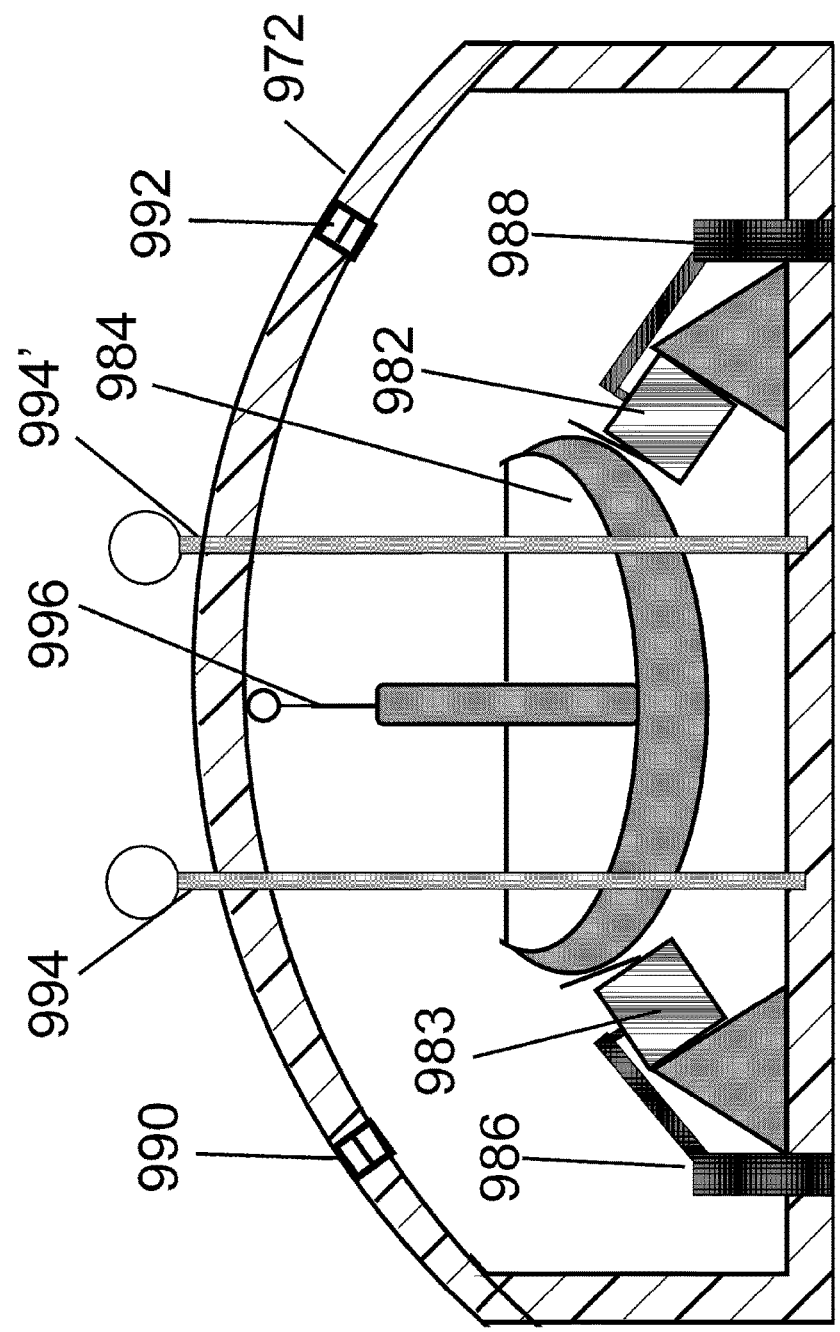
FIG. 24 is a blown up cross-section of the pendulum trigger assembly of FIG. 23.

FIG. 24 is a blown up view of the upper portion of FIG. 23 to better illustrate how the pendulum weight 984 and triggers 982 and 983 are constructed. Pendulum weight 984 is suspended from the inside surface of spherical housing 972 by a fine but strong wire 996 so that it is free to swing in any direction in response to rotation of the excavation-sensing module. While the pendulum weight is in the orientation shown in FIG. 23, it keeps the trigger latches depressed. When the pendulum moves to one side or the other, one of the triggers (982, 983) will be actuated because its latch will be freed and it will pivot and release the hammer inside the trigger. This fires a percussion cap or primer and ignites fuse train 986, 988 which, in turn, ignites the compound 980 [not shown in FIG. 24]. The intense smoke generated fills the interior of spherical housing 972 with gas and builds up enough pressure to rupture the friable diaphragm in bores 990 and 992 so that the gas escapes to the outside.

Pendulum weight 984 is maintained in a safe orientation during emplacement of the excavation-sensing module by safety bars 994, 994'. These bars are pulled out of the excavation-sensing module after emplacement by wires [not shown]. This arms the excavation-sensing module.

Figure 25:
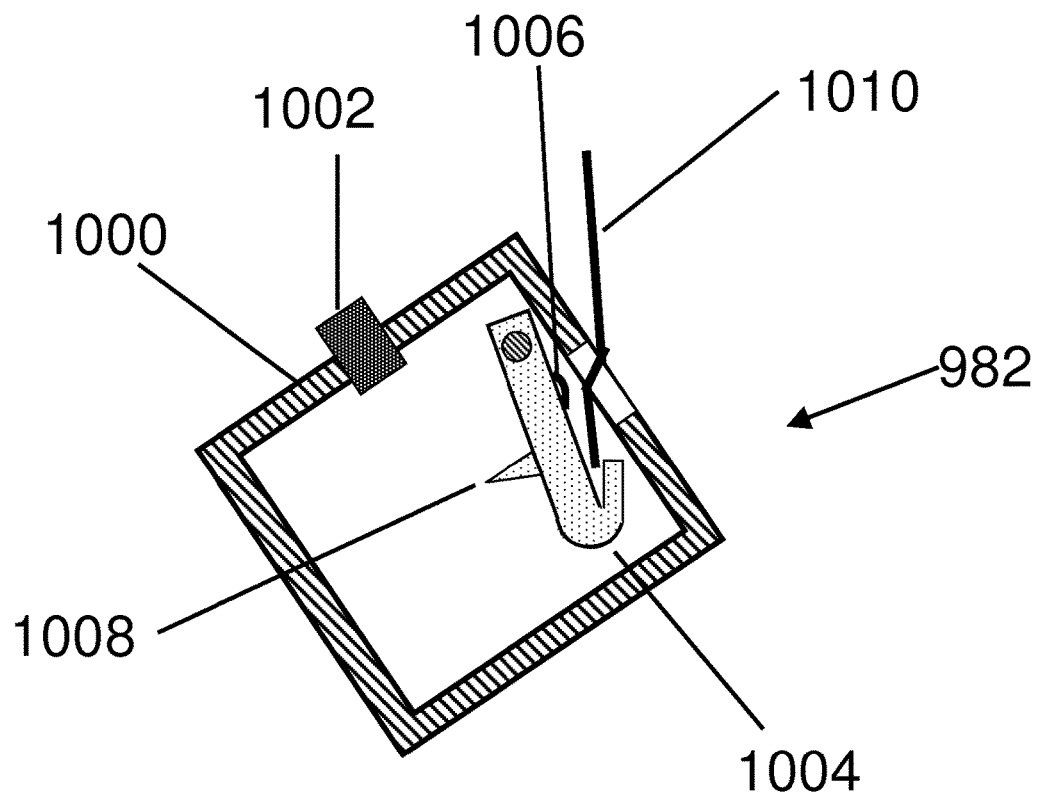
FIG. 25 shows a cross-section of the ignition element from the pendulum trigger assembly of FIGS. 23 and 24.

Triggers 982 and 983 are shown in more detail in FIG. 25. They are very similar in design to the standard US Army Firing Device, Release Type, M1 as illustrated at page 79 of TM 9-1946 published by the Department of the Army on 29 Nov. 1955. They comprise a casing 1000 which holds a percussion cap or primer 1002 in one wall thereof. Hammer 1004 is pivotally mounted within casing 1000. Hammer 1004 is biased by spring 1006 towards percussion cap or primer 1002. Hammer 1004 has a firing pin 1008 which will impact percussion cap or primer 1002 when the hammer is released. Hammer 1004 is held in the position shown in FIG. 24 by latch 1010. When latch 1010 is biased towards casing 1000, as shown in FIG. 25, it holds hammer 1004 in the position shown. When latch 1010 is allowed to move away from casing 1000 [by motion of the pendulum weight 984 not shown in FIG. 25], it releases hammer 1004 and permits the hammer to swing towards percussion cap or primer 1002. The impact of firing pin 1008 on percussion cap or primer 1002 sets off percussion cap or primer 1002.

Figure 26:
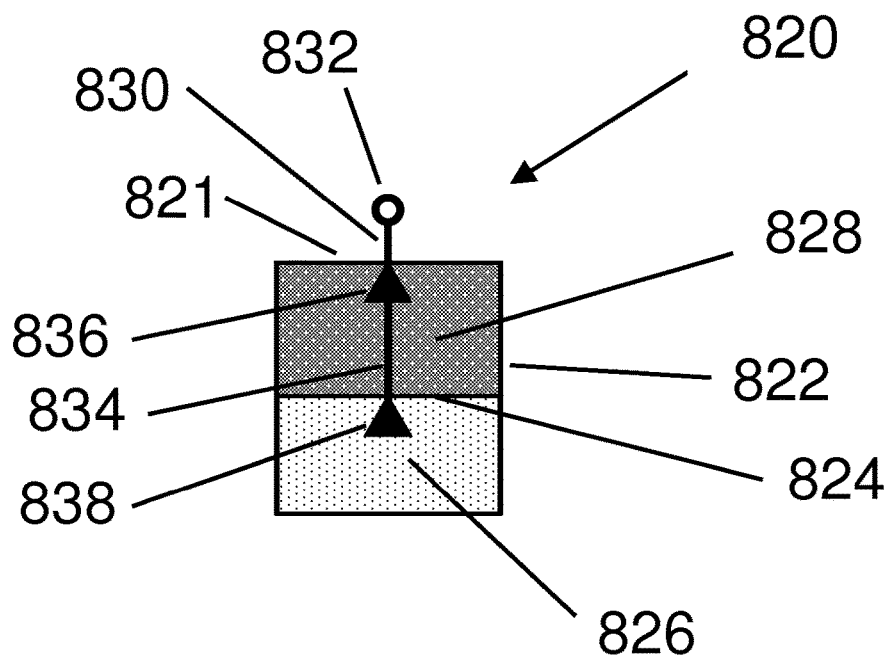
FIG. 26 shows a cross-section of an alternate gas source for the buried infrastructure excavation-sensing module of FIG. 7.

FIG. 26 shows a cross-section of an alternate gas source 820 for the buried infrastructure excavation-sensing module of FIG. 7. A cylindrical container 822 is internally divided into two compartments by diaphragm 824. A highly compressed gas 826—such as air, $CO_2$ or any other suitable gas is contained in the lower portion of container 822. A finely divided colored powder or colored liquid 828 is contained in the upper portion of container 822. This finely divided colored powder or colored liquid 828 is blown out of the container 822 with great force when trigger 830 is pulled upwards causing a cloud of visible gas to form. Trigger 830 comprises a pull 28 32 which is attached to the end of rod member 834 and two conical assemblies 836 and 838 which are also attached to rod 834.

Figure 27:
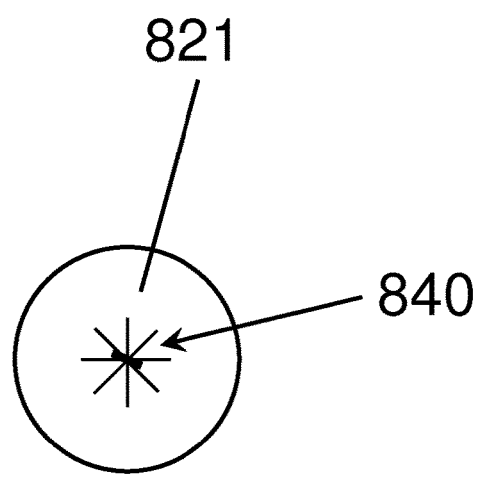
FIG. 27 shows a top view of the alternate gas source for the buried infrastructure excavation-sensing module shown in FIG. 26.

FIG. 27 shows a top view of container 822 shown in FIG. 25. The top wall 821 of container 822 is weakened or scored along lines 840 such that conical member 836 will rupture top wall 821 when the pull ring 832 is pulled upwardly. Diaphragm 824 is constructed in similar manner to rupture when struck by conical member 838. Score lines 840 are shown as being radial in FIG. 27, however, it is clear that they could be circular or of any other suitable configuration which would be known to one of ordinary skill in this art.

Figure 28:
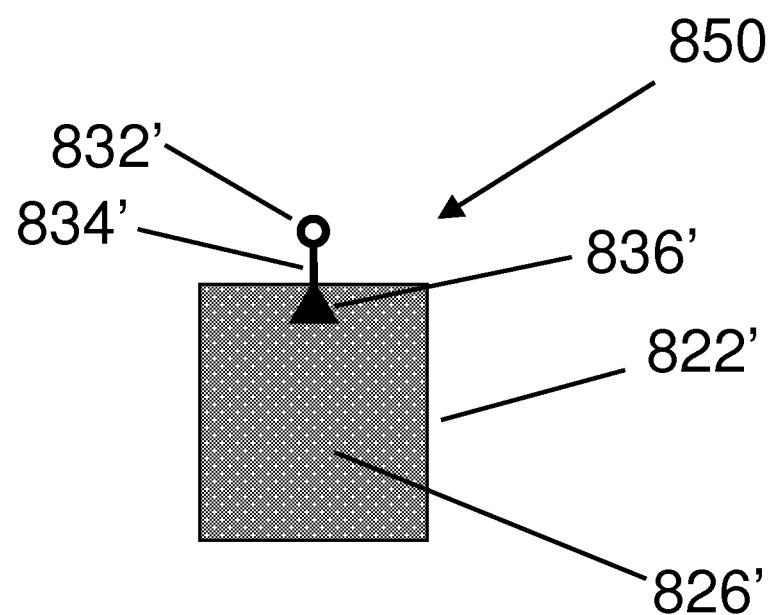
FIG. 28 shows a cross-section of a second alternate gas source for the buried infrastructure excavation-sensing module of FIG. 7.

FIG. 28 shows a cross-section of a second alternate gas source 850 for the buried infrastructure excavation-sensing module of FIG. 7. Container 822' contains a mixture of highly compressed gas 826' admixed with a finely divided colored powder or colored liquid. Pull ring 832' is connected to conical member 836' by rod member 834' such that conical member 836' will rupture container 822' when pulled upwardly thus releasing the admixed gas and colored powder or liquid. This is achieved in a manner similar to that shown in FIG. 27.

Figure 29:
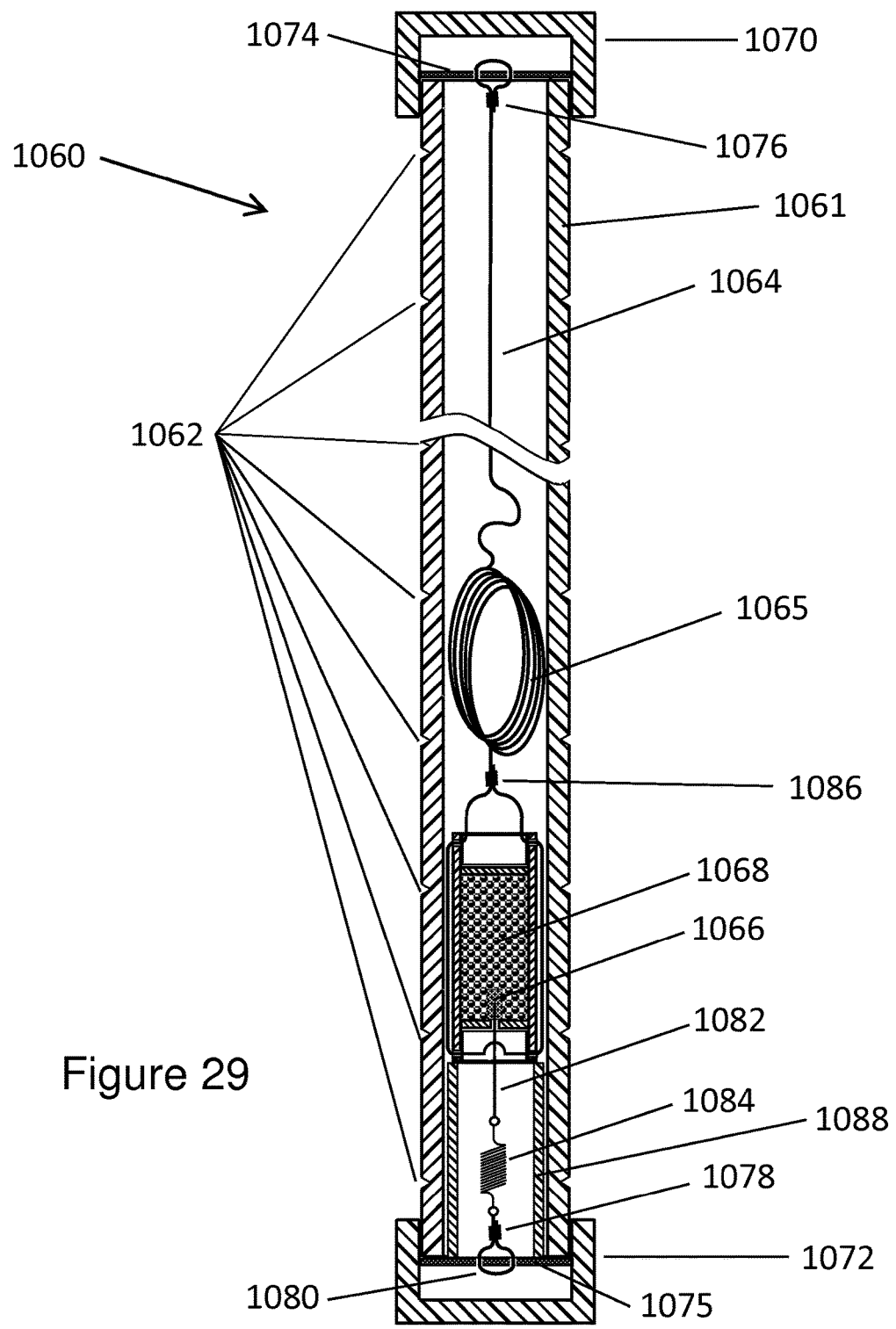
FIG. 29 shows a cross-section of a fifteenth embodiment of a buried infrastructure excavation-sensing module 1060 generally similar to that shown in FIG. 7.

FIG. 29 illustrates a fifteenth embodiment of a buried infrastructure excavation-sensing module 1060 generally similar but improved over the module 60 shown in FIG. 7. Module 1060 comprises an elongated tubular housing 1061 with first and second opposite ends which ends are closed by caps 1070 and 1072. Elongated tubular housing 1061 has a plurality of circumferential scores 1062 placed along the length thereof. The circumferential scores 1062 are shown as being triangular in cross-section but could have any other suitable geometry. Circumferential scores 1062 are designed to weaken housing 1061 such that when excavation equipment (not shown) applies external shear, tensile or torsional forces, said housing will break along one or more of the circumferential scores 1062. A smoke grenade 1068 is loosely mounted near one end of housing 1061. Smoke Grenade 1068 has a pull-type friction igniter comprising an igniter module 1066 and a pull wire 1082. When pull wire 1082 is pulled from igniter module 1066, friction between the pull wire 1082 and the igniter module 1066 causes igniter module 1066 to ignite setting off the smoke generating material within smoke grenade 1068.

In this embodiment, pull wire 1082 is secured to a first end of housing 1061 proximate to end cap 1072. Stop plates 1074 and 1075 are secured to the opposing first and second ends of housing 1061. Pull wire 1082 is secured to stop plate 1075 by being connected to one end of spring 1084. The other end of spring 1084 is secured to stop plate 1075 by means of anchor wire 1080 which is looped through two holes in stop plate 1085 with the ends swaged together as shown at 1078. In this embodiment stop plates 1074 and 1075 are made of metal, but it is obvious that other suitable materials could also be used. The body of smoke grenade 1068 is pulled away from end cap 1072 by wire 1064 which is secured at one end of said wire to the smoke grenade in a manner which will be further described below with regard to FIG. 31. The other end of said wire 1064 is secured to stop plate 1074 by being looped through two holes in said stop plate. A rugged connection to stop plate 1074 is assured because the end of wire 1064 which is looped through said holes is swaged to the remaining wire as shown at 1076. When excavation equipment (not shown) strikes housing 1061 and breaks said housing, wire 1064 is stretched. Eventually, wire 1064 will pull the smoke grenade body away from end cap 1072 causing pull wire 1082 to ignite the smoke grenade in a manner that will be further described below with regard to FIGS. 32A-32C.

It has been found through field testing, that the excavation-sensing module 1060 performs better if extra wire is emplaced within the hollow body of housing 1061. To this end, extra wire is coiled in multiple loops 1065 within housing 1061. For relatively shallow buried infrastructure it has been found that there should be about 8 feet of wire coiled inside the module 1060. The amount of wire contained inside module 1060 can obviously vary, and the necessary amount will depend upon various site factors such as, for example, the depth of the buried infrastructure and may well vary depending upon soil conditions. In this way, a portion of the housing 1061 (usually the upper portion of housing 1061 and end cap 1070) is carried with the excavator (usually an excavation bucket) to the surface. Since one end of wire 1064 is attached to stop plate 1074 near cap 1070, wire 1064 is extended and ultimately pulls smoke grenade 1068 out of the remaining portion of housing 1061, igniting smoke grenade 1068 in the process. It has been found that it is normal for ignited smoke grenade 1068 to be pulled to the surface with or without other portions of module 1060. Thus the excavation crew is alerted to the presence of the buried infrastructure.

It has also been found through field testing, that ignition of the smoke grenade was not as reliable as desired when pull wire 1082 was rigidly attached to stop plate 1075. For this reason, the attachment was modified and spring 1084 placed between pull wire 1082 and anchor wire 1080. It was found that use of spring 1084 provided greatly increased ignition reliability. This process will be further explained below using FIGS. 32 A-32C. Cylindrical spacer 1088 was emplaced between the body of smoke grenade 1068 and stop plate 1075 to keep spring 1084 extended in a non-loaded and untangled condition.

Figure 30:
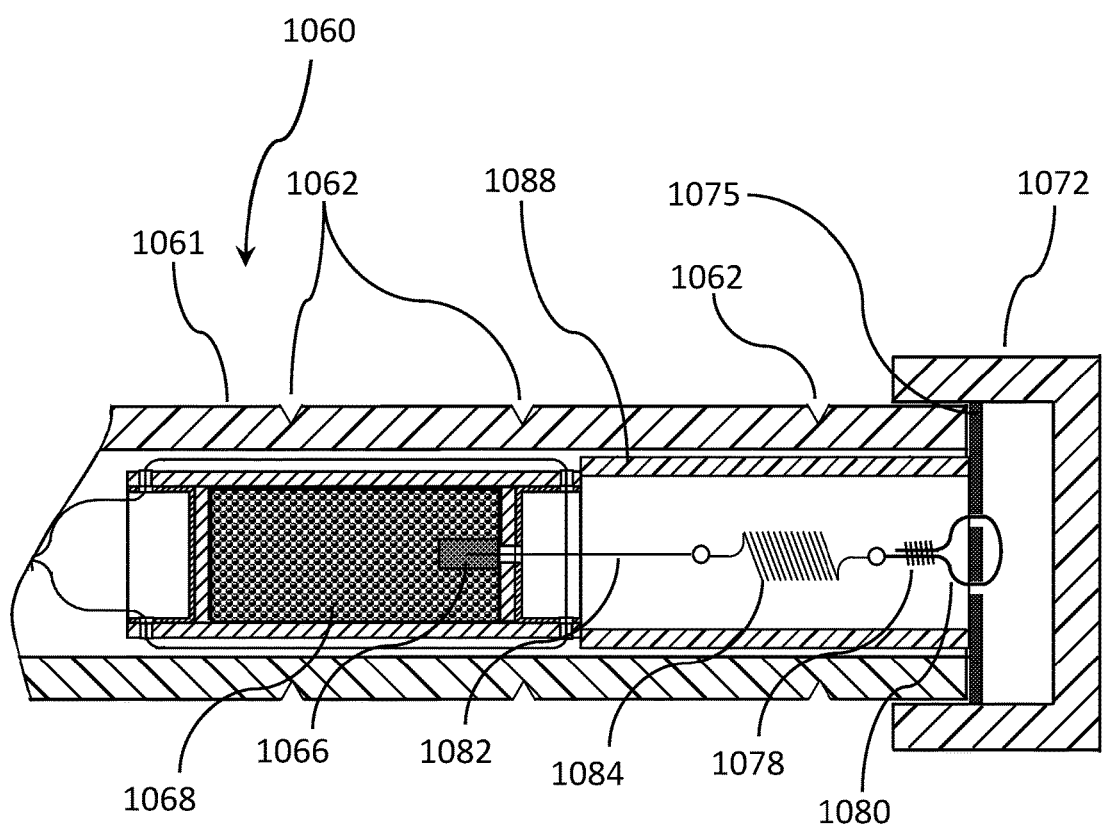
FIG. 30 shows an enlarged sectional view of the lower portion of the embodiment shown in FIG. 29.

FIG. 30 shows an enlarged view of the lower portion of the self-contained excavation-sensing module 1060 of FIG. 29. Module 1060 has an elongated tubular housing 1061 with a plurality of circumferential scores 1062 therein. Smoke grenade 1068 is shown loosely emplaced at the end of housing 1061 closest to end cap 1072. Wire 1064 is shown connected to smoke grenade 1068 in a manner that will be further described below with regard to FIG. 31. Smoke grenade 1068 has an igniter module 1066 with a pull wire 1082 extending from one end of smoke grenade 1068. The smoke grenade is loosely emplaced in housing 1061 near the end of said housing proximate to end cap 1072. Spacer 1088 extends from the end of the smoke grenade proximate to end cap 1072 to stop plate 1075. Pull wire 1082 is secured to stop plate 1075 by spring 1084. One end of spring 1084 is secured to pull wire 1082 and the other end of spring 1084 is secured to stop plate 1075 by anchor wire 1080. Anchor wire 1080 is secured to stop plate 1075 by being looped through two holes in said stop plate. A rugged connection to stop plate 1075 is assured because the end of anchor wire 1080 which is looped through said holes is swaged to the remaining wire as shown at 1078. The purpose of cylindrical spacer 1088 is to keep spring 1084 extended in a non-loaded and untangled condition.

Figure 31:
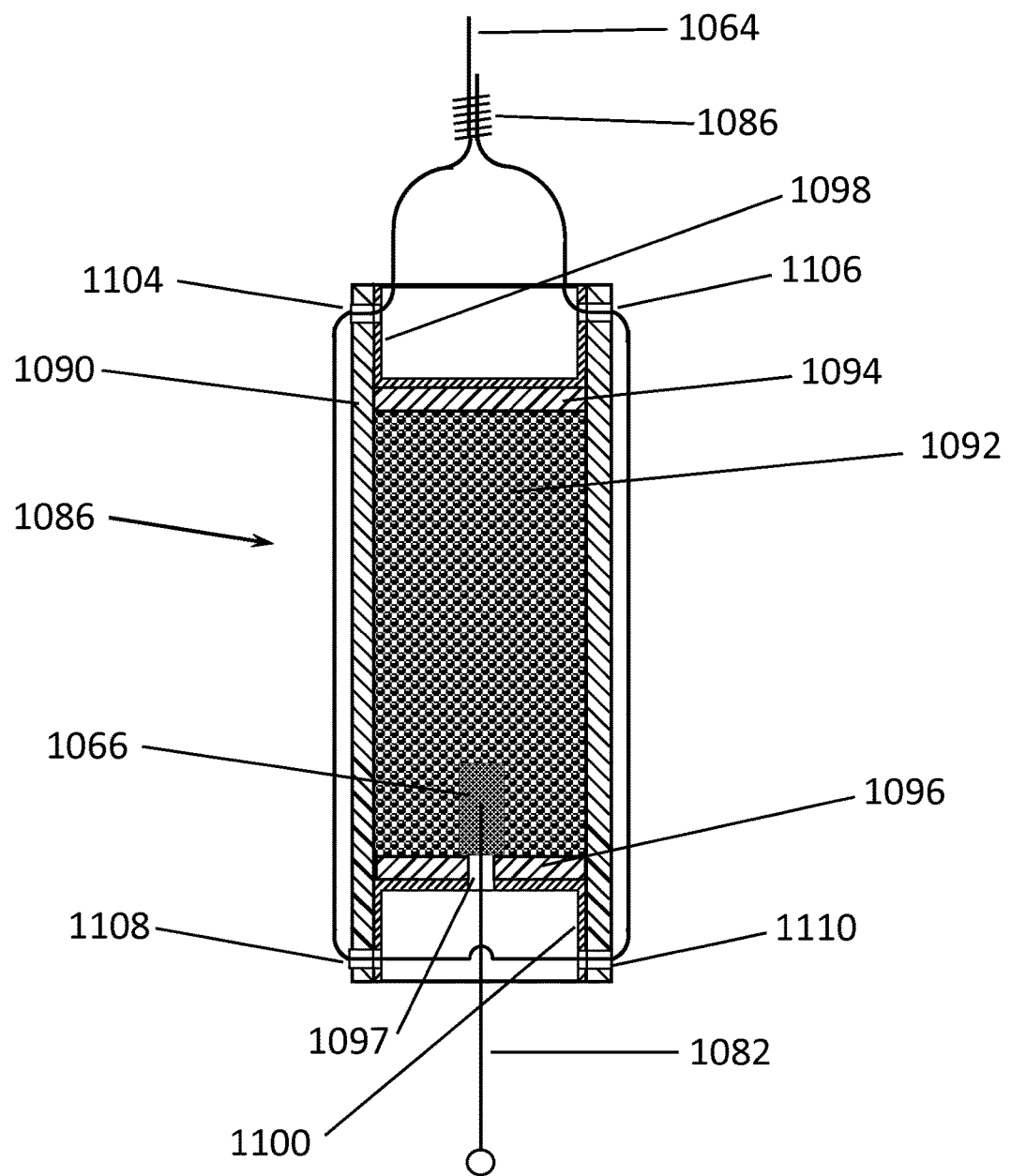
FIG. 31 shows an enlarged cross-sectional view of the smoke grenade 1068 shown in FIGS. 29 and 30.

FIG. 31 shows an enlarged view of smoke grenade 1068 and illustrates how the wire 1064 is attached thereto. Smoke grenade 1068 has a housing 1090 made of thick cardboard or other suitable material. Housing 1090 is closed at one end by plug 1094. Housing 1090 is partially closed at the other end of said housing by plug 1096 which plug has a nozzle 1097 therein to permit smoke to exit the smoke grenade. Smoke grenade 1068 is filled with a suitable smoke generating compound 1092 and has an igniter module 1066 therein with a pull wire 1082 extending therefrom which permits smoke generating compound 1092 to be ignited when pull wire 1082 is pulled out of igniter module 1066. Wire 1064 is connected at one end to stop plate 1074 (shown in FIG. 29) and at the other end to smoke grenade 1068. When an excavator (not shown) strikes the module and causes tubular housing 1061 (FIGS. 29 and 30) to break and pulls the broken-off upper portion of module 60 upwards, wire 1064 pulls smoke grenade 1068 upwards causing pull wire 1082, which is fastened to the stop plate 1075 (FIGS. 29 and 30), to be pulled out of igniter module 1066 thereby igniting the smoke generating compound 1092. Without careful attention to the design, it has been that the smoke grenade 1068 may come apart as it is being pulled out of the broken module 60. To prevent this, metal cups 1098 and 1100 are fitted within the openings at each end of smoke grenade 1068. In this embodiment caps 1098 and 1100 are made of metal, but it is obvious that other suitable materials could also be used. Holes, 1104, 1106, 1108 and 1110 are bored near the outer ends of smoke grenade housing 1090. These holes extend through the walls of metal cups 1098 and 1100. Wire 1064 is threaded through each hole as shown in FIG. 31 such that the smoke grenade is essentially surrounded by wire 1064. The loose end of wire 1064 extending from hole 1106 is swaged to wire 1064 slightly above the smoke grenade as shown at 1086 to form a secure connection. With this design, the smoke grenade 1068 remains intact when wire 1064 pulls the smoke grenade from the broken module 60 and to the surface.

Figure 32A:
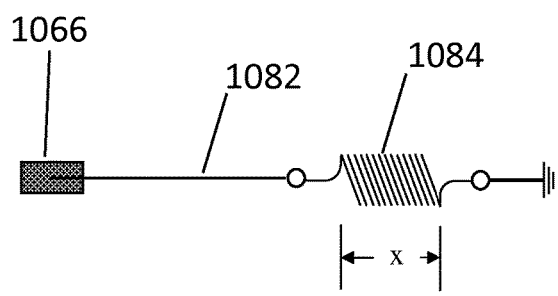
FIG. 32A-32C illustrate the interaction of spring 1084 and pull wire 1082 to ensure reliable ignition of igniter module 1066 and thus smoke grenade 1068.
Figure 32B:
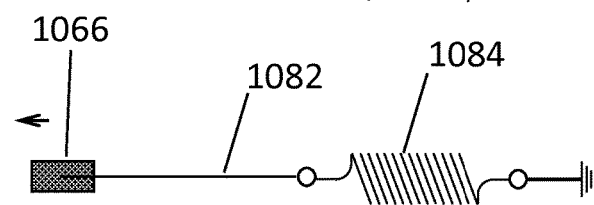
Figure 32C:
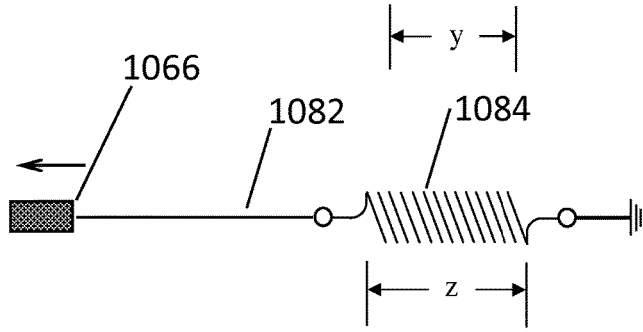

FIGS. 32A-32C illustrate the manner in which spring 1084 assures reliable ignition of ignition module 1066 and thus smoke generating compound 1092 within smoke grenade 1068. It has been found through field testing, that ignition of the smoke grenade was not as reliable as desired when pull wire 1082 was rigidly attached to stop plate 1075. The speed of the excavator was sometimes not sufficient to drag pull wire 1082 out of ignition module 1066 fast enough to insure reliable ignition. For this reason, spring 1084 was placed between pull wire 1082 and anchor wire 1080. It was found that use of spring 1084 provided greatly increased ignition reliability. This process will is illustrated in FIGS. 32 A-32C.

FIG. 32A illustrates ignition module 1066, pull wire 1082 and spring 1084 in the unloaded or equilibrium position with the spring 1084 having an equilibrium length x.

FIG. 32B illustrates the situation where smoke grenade 1068 has been moved slightly to the left and spring 1084 has been extended slightly to a length y. However, the spring constant of spring 1084 has been selected such that the force exerted by the spring when stretched to length y is insufficient to overcome the static friction between igniter module 1066 and pull wire 1082. Thus, even though the smoke grenade has been moved slightly to the left in FIG. 32B, there is no relative movement between pull wire 1082 and igniter module 1066.

FIG. 32C illustrates the situation where the smoke grenade has been pulled further to the left and the extension z of spring 1084 is sufficient to cause the spring to exert enough force on pull wire 1082 to overcome the static friction between pull wire 1082 and igniter module 1066 causing pull wire 1082 to begin to move outwardly of igniter module 1066. At this point, the stored energy in the spring due to extension z causes pull wire 1082 to accelerate to the right thus insuring reliable ignition of igniter module 1066 and smoke grenade 1068.

Operation:

The buried infrastructure excavation-sensing modules are designed to protect buried infrastructure by alerting construction crews or other workers that their excavation is nearing a protected underground structure. The visible odorous vapor or smoke coupled with a loud sound will alert three different senses and provide redundancy and robustness of the alarm at the site of the excavation. This gives an important advantage over other monitoring devices that alert a remote monitoring station who then has to alert the construction crew. The individual buried infrastructure excavation-sensing modules are designed to be implanted via an air lance or auger over or around an existing buried structure; coupled buried infrastructure excavation-sensing modules may require a narrow trench for installation. Once installed, no maintenance or active monitoring is required.

Spikes or whiskers broaden the alert volume of each buried infrastructure excavation-sensing module as does the coupling between multiple units. As desired, the color of the vapor or smoke can be chosen to match the American Public Works Association (APWA) Uniform Color Codes for marking underground utilities:

Red—electric power lines, cables, conduit, and lighting cables
Orange—telecommunication, alarm or signal lines, cables, or conduit
Yellow—natural gas, oil, steam, petroleum, or other gaseous or flammable material
Green—sewers and drain lines
Blue—drinking water
Violet—reclaimed water, irrigation, and slurry lines
Pink—temporary survey markings, unknown/unidentified facilities The colored, visible vapor or smoke can be generated by any of the exothermic or endothermic processes. For example, by compressed gas stored in the buried infrastructure excavation-sensing modules; solid smoke generators, such as smoke grenades or smoke balls; or by a chemical reaction of at least one stored reactant. The color can be inherent or can be added via pigments. The odor is designed to be a smell unexpected in the construction environment; it could be unpleasant, e.g., $H_2S$, or pleasant, e.g., floral. The sound can either be the gas escaping via a whistle or the boom of the reaction. Because the buried infrastructure excavation-sensing modules could be used in a residential area or an area that might become residential, the colored, odorous vapor must be nontoxic and any reactions must be confined within the buried infrastructure excavation-sensing module.

The buried infrastructure excavation-sensing modules may have indicia located on or integrated with the outer portion of the module housing. The purposes of the indicia are to make the module more visible to an observer, to aid in identification of the associated buried infrastructure, and to provide any other desirable information. The use of color in or on the module housing allows for a quick visual identification of the module itself and may provide information as to the type of material associated with the buried infrastructure.

In order to make the module more visible, the housing of the module may be made from a brightly colored polymeric material. Another way to achieve this effect might be to apply to the outer portion of the module housing a brightly colored coating. If desired, the color of the housing can be chosen to match the American Public Works Association (APWA) Uniform Color Codes for marking underground utilities as noted above. It is not uncommon in the construction industry to have an observer looking inside the trench as it is being excavated. It is very possible that this observer might see a partially exposed buried infrastructure excavation-sensing module which is visible in the trench but which has not yet been triggered. The indicia on or integrated with the module housing will make it easier for this identification to be made thus alerting the construction crew to the presence of the buried infrastructure excavation-sensing module [and thus the buried infrastructure] even before the buried infrastructure excavation-sensing module is triggered.

The buried infrastructure excavation-sensing modules may be color coded, as noted above, to provide a quick identification of the type of material associated with the buried infrastructure. In addition, other information may be contained in a substrate located on an external portion of the housing. This information may be indicia imprinted upon or inscribed in the substrate and may constitute identification, contact, or any other desirable information. This information may also be carried in a microchip, microfiche, or any other suitable storage media.

The buried infrastructure excavation-sensing modules may utilize purely mechanical means in the fusing and/or triggering mechanisms as discussed above or electronic components may be utilized. For example, the smoke grenades commonly available often have a friction pull-type igniter. One reason for using a purely mechanical approach is to avoid the necessity of dealing with a power supply. One of the most common power supplies which are utilized with remote systems is a battery. A battery with a shelf-life of 10 years or more is not unknown at the present time, meaning that an electronic fusing/triggering system which has a zero power requirement until the triggering event might well be utilized with the buried infrastructure excavation-sensing modules. It is clearly within the realm of one of ordinary skill in this art to utilize smoke generators with electronic fuses, igniters, and/or triggering means.

The above-described embodiments are merely illustrative of the principles of the invention. Those skilled in the art may make various modifications and changes, which will embody the principles of the invention and fall within the spirit and scope thereof.

The invention claimed is:

1. A self-contained excavation-sensing module capable of being emplaced in the soil near an existing buried structure with said module comprising:

an elongated, tubular housing with opposing first and second ends, a smoke generator comprising a body having first and second ends emplaced within said elongated tubular housing with a pull-type igniter extending from said first end of said smoke generator body, said smoke generator body being loosely emplaced near said first end of said elongated, tubular housing, said pull-type igniter being affixed to said first end of said elongated, tubular housing by a spring, wherein said pull-type igniter has a predetermined force required to move said pull-type igniter out of said smoke generator body and further wherein said spring has a predetermined spring constant such that with a first, predetermined small extension of said spring, said spring cannot exert enough force to move said pull-type igniter away from said smoke generator body, but with said predetermined spring constant being selected such that said spring can exert enough force to move said pull-type igniter away from said smoke generator body upon reaching a second, predetermined larger extension of said spring an actuator which will cause said smoke generator to release smoke when said module is disturbed by an external force, said actuator comprising a wire with one end of said wire affixed to said second end of said smoke generator body and having the other end of said wire affixed to said second end of said elongated, tubular housing; and, said elongated, tubular housing being provided with at least one weakened area such that said elongated, tubular housing is strong enough to maintain its structural integrity during manufacture, routine handling and implantation of said excavation-sensing module in the soil, but with said elongated, tubular housing being weak enough such that said elongated, tubular housing will break upon application of predetermined external shear, tensile and torsional forces of the type imparted by excavation equipment striking said elongated, tubular housing.

2. The self-contained excavation-sensing module of claim 1 wherein said smoke generator comprises a smoke grenade.

3. The self-contained excavation-sensing module of claim 1, wherein said at least one weakened area comprises at least one circumferential score in the elongated, tubular housing.

4. The self-contained excavation-sensing module of claim 3, wherein said at least one circumferential score has a triangular cross-section.

5. The self-contained excavation-sensing module of claim 1, wherein said elongated, tubular housing comprises a brightly-colored material.

6. The self-contained excavation-sensing module of claim 1, wherein said elongated, tubular housing is coated with a brightly-colored material.

7. The self-contained excavation-sensing module of claim 1, wherein said elongated, tubular housing comprises a polyvinylchloride tube.

8. The self-contained excavation-sensing module of claim 1, wherein said elongated, tubular housing carries identification and contact indicia.

9. The self-contained excavation-sensing module of claim 1 wherein said elongated, tubular housing has a predetermined length and the length of said wire is greater than said predetermined length of said elongated, tubular housing.

10. The self-contained excavation-sensing module of claim 9, wherein the length of said wire is approximately twice the predetermined length of said elongated, tubular housing.

11. The self-contained excavation-sensing module of claim 9, wherein the length of said wire is approximately three times the predetermined length of said elongated, tubular housing.

12. The self-contained excavation-sensing module of claim 11, wherein said smoke generator comprises a smoke grenade.

* * * * *